US012724486B2

(12) United States Patent
Adodin

(10) Patent No.: US 12,724,486 B2
(45) Date of Patent: Sep. 1, 2026

(54) INFORMATION PROCESSING APPARATUS AND INFORMATION PROCESSING METHOD

(71) Applicant: SONY GROUP CORPORATION, Tokyo (JP)

(72) Inventor: Pavel Adodin, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 236 days.

(21) Appl. No.: 18/572,407

(22) PCT Filed: Feb. 10, 2022

(86) PCT No.: PCT/JP2022/005252
§ 371 (c)(1),
(2) Date: Dec. 20, 2023

(87) PCT Pub. No.: WO2023/276239
PCT Pub. Date: Jan. 5, 2023

(65) Prior Publication Data

US 2024/0310917 A1 Sep. 19, 2024

(30) Foreign Application Priority Data

Jun. 28, 2021 (JP) ................................ 2021-106321

(51) Int. Cl.
*G06F 3/01* (2006.01)
*B25J 13/08* (2006.01)

(52) U.S. Cl.
CPC ........... *G06F 3/016* (2013.01); *B25J 13/087* (2013.01); *G06F 3/011* (2013.01)

(58) Field of Classification Search
CPC .......... G06F 3/016; G06F 3/011; G06F 3/015; G06F 3/01; G06F 3/0346; B25J 13/087
See application file for complete search history.

(56) References Cited

U.S. PATENT DOCUMENTS 5,549,656 A * 8/1996 Reiss ................ A61N 1/36003 607/70
8,285,381 B2 * 10/2012 Fahey ................ A61N 1/0492 607/144

(Continued)

FOREIGN PATENT DOCUMENTS

| | | |
|---|---|---|
| JP | 2001-054507 A | 2/2001 |
| JP | 2003-337962 A | 11/2003 |
| WO | 2017/131145 A1 | 8/2017 |

OTHER PUBLICATIONS

International Search Report and Written Opinion of PCT Application No. PCT/JP2019/028009, issued on Sep. 17, 2019, 08 pages of ISRWO.

*Primary Examiner* — Masud Ahmed
(74) *Attorney, Agent, or Firm* — CHIP LAW GROUP

(57) ABSTRACT

There is provided an information processing apparatus and an information processing method that enable realization of haptic feedback that does not hinder the movement of an operator. The information processing apparatus includes an acquisition unit that acquires change information indicating a change in physical quantity related to an operation target corresponding to extension or contraction of a muscle of a site in a body of a user, and a calculation unit that calculates an extension/contraction amount corresponding to the change in physical quantity on the basis of the change information.

18 Claims, 18 Drawing Sheets

(56) References Cited

U.S. PATENT DOCUMENTS

| | | | | |
|---|---|---|---|---|
| 2024/0402814 | A1* | 12/2024 | Kafadar .................. | G06F 3/014 |
| 2024/0412869 | A1* | 12/2024 | Pandarinath ............ | G06F 3/015 |
| 2025/0238073 | A1* | 7/2025 | Yamagishi ............. | G06F 3/011 |

* cited by examiner

FIG. 4

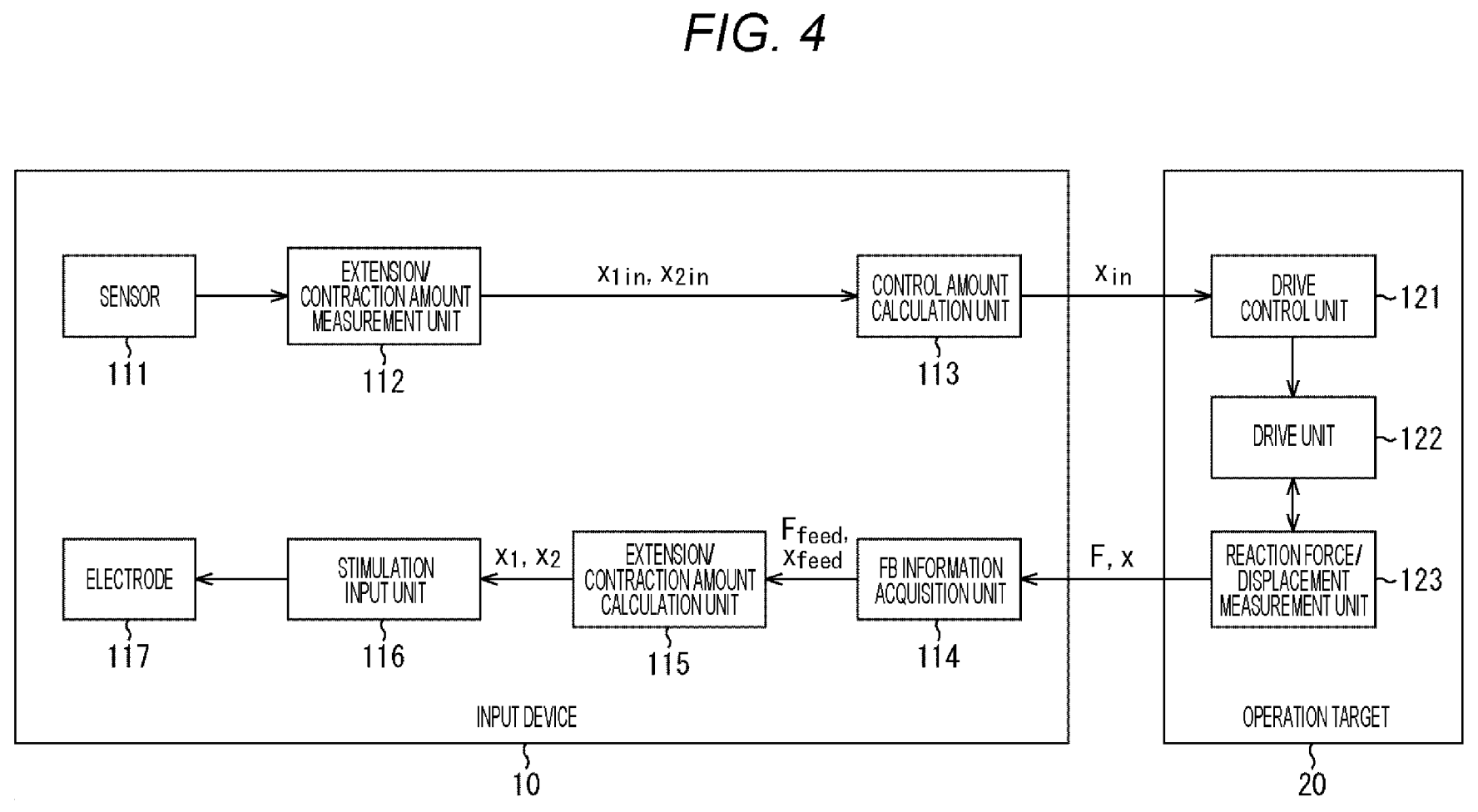

DRIVE CONTROL UNIT 121

DRIVE UNIT 122

REACTION FORCE/ DISPLACEMENT MEASUREMENT UNIT 123

OPERATION TARGET 20

Xin

F, X

SENSOR 111

EXTENSION/ CONTRACTION AMOUNT MEASUREMENT UNIT 112

X1in, X2in

CONTROL AMOUNT CALCULATION UNIT 113

FB INFORMATION ACQUISITION UNIT 114

$F_{feed}$, $X_{feed}$

EXTENSION/ CONTRACTION AMOUNT CALCULATION UNIT 115

X1, X2

STIMULATION INPUT UNIT 116

ELECTRODE 117

INPUT DEVICE 10

DRIVE CONTROL UNIT
221
DRIVE UNIT
222
REACTION FORCE MEASUREMENT UNIT
223
OPERATION TARGET
20
Xin
F
CONTROL AMOUNT CALCULATION UNIT
213
FB INFORMATION ACQUISITION UNIT
214
Ffeed
EXTENSION/ CONTRACTION AMOUNT CALCULATION UNIT
215
X1in, X2in
EXTENSION/ CONTRACTION AMOUNT MEASUREMENT UNIT
212
X1, X2
STIMULATION INPUT UNIT
216
SENSOR
211
ELECTRODE
217
INPUT DEVICE
10

DRIVE CONTROL UNIT
321
DRIVE UNIT
322
REACTION FORCE MEASUREMENT UNIT
323
OPERATION TARGET
20
Xin
F
CONTROL AMOUNT CALCULATION UNIT
313
FB INFORMATION ACQUISITION UNIT
314
Xfeed
X1in, X2in
EXTENSION/ CONTRACTION AMOUNT CALCULATION UNIT
315
X1, X2
INPUT DEVICE
10
EXTENSION/ CONTRACTION AMOUNT MEASUREMENT UNIT
312
STIMULATION INPUT UNIT
316
SENSOR
311
ELECTRODE
317

OPERATION TARGET
520
Xin
x, F
CONTROL AMOUNT CALCULATION UNIT
531
FB INFORMATION ACQUISITION UNIT
532
Xfeed, Ffeed
EXTENSION/ CONTRACTION AMOUNT CALCULATION UNIT
533
SERVER
530
X1in, X2in
X1, X2
INPUT DEVICE
510

900
COMPUTER
901
CPU
902
ROM
903
RAM
904
905
INPUT/OUTPUT INTERFACE
906
INPUT UNIT
907
OUTPUT UNIT
908
STORAGE UNIT
909
COMMUNICATION UNIT
910
DRIVE
911
REMOVABLE MEDIUM

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2022/005252 filed on Feb. 10, 2022, which claims priority benefit of Japanese Patent Application No. JP 2021-106321 filed in the Japan Patent Office on Jun. 28, 2021. Each of the above-referenced applications is hereby incorporated herein by reference in its entirety.

TECHNICAL FIELD

The present disclosure relates to an information processing apparatus, an information processing method, and a program, and more particularly to an information processing apparatus, an information processing method, and a program that enable realization of haptic feedback that does not hinder the movement of an operator.

BACKGROUND ART

There is known a technology in which a plurality of electrodes is attached to a body site, such as an arm, of a user, and an electrical stimulation signal is applied from the electrodes to the muscle of the site to move the arm or the like of the user by an external command.

Patent Document 1 discloses an electrical stimulation apparatus in which a plurality of electrodes and a plurality of optical distance sensors are provided on a wristband wound around an arm of a user, and the muscle of the arm is stimulated while the displacement of the muscle is detected.

Meanwhile, a technology for providing haptic feedback is often used in a remote-operated robot so that an operator who performs remote operation grasps the feel of the robot when the robot manipulates an object at a remote location or comes into contact with an object in the surroundings.

CITATION LIST

Patent Document

Patent Document 1: WO 2017/131145

SUMMARY OF THE INVENTION

Problems to be Solved by the Invention

Most of input devices that realize haptic feedback are either of two types: exoskeleton-type devices and glove-type devices. However, these devices are large, expensive, and wearable, thus restricting the movement of the operator.

The present disclosure has been made in view of such a situation, and realizes haptic feedback that does not hinder the movement of an operator.

Solutions to Problems

An information processing apparatus of the present disclosure is an information processing apparatus including: an acquisition unit that acquires change information indicating a change in physical quantity related to an operation target corresponding to extension or contraction of a muscle of a site in a body of a user and a calculation unit that calculates an extension/contraction amount of the muscle corresponding to the change in physical quantity on the basis of the change information.

An information processing method of the present disclosure is an information processing method including: an information processing apparatus acquiring change information indicating a change in physical quantity related to a motion of an operation target corresponding to a displacement in a muscle of a site in a body of a user; and the information processing apparatus calculating an extension/contraction amount of the muscle corresponding to the change in physical quantity on the basis of the change information.

A program of the present disclosure is a program that causes a computer to execute processing of: acquiring change information indicating a change in physical quantity related to a motion of an operation target corresponding to a displacement in a muscle of a site in a body of a user; and calculating an extension/contraction amount of the muscle corresponding to the change in physical quantity on the basis of the change information.

In the present disclosure, change information indicating a change in physical quantity related to a motion of an operation target corresponding to a displacement in a muscle of a site in a body of a user is acquired, and an extension/contraction amount of the muscle corresponding to the change in physical quantity is calculated on the basis of the change information.

BRIEF DESCRIPTION OF DRAWINGS

FIG. 4 is a block diagram illustrating a functional configuration example of an input device according to a first embodiment.

MODE FOR CARRYING OUT THE INVENTION

Figure 1:
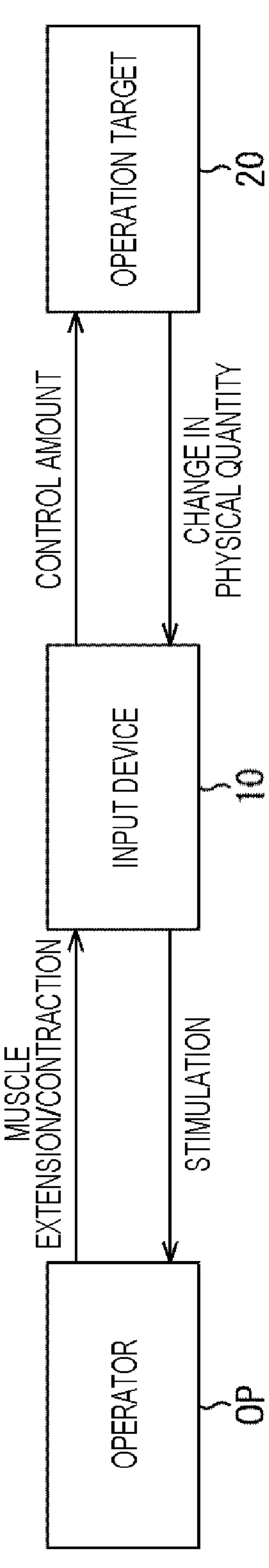
FIG. 1 is a diagram illustrating a configuration example of a remote operation system to which the technology according to the present disclosure is applicable.

Hereinafter, modes for carrying out the present disclosure (hereinafter referred to as embodiments) will be described. Note that the description will be given in the following order.

1. Input device with haptic feedback function and problems thereof
2. Overview of technology according to present disclosure
3. First Embodiment (reaction force/displacement feedbacks)
4. Second Embodiment (reaction force feedback)
5. Third Embodiment (displacement feedback)
6. Workarounds for interference between feedback and operator input
7. Construction of mapping model
8. Example of calibration method
9. Modification
10. Other Application Examples
11. Configuration example of computer

1. Input Device with Haptic Feedback Function and Problems Thereof

Conventionally, in a remote operation system including a remote-operated robot, information such as a position, speed, and force corresponding to the movement of an operator is transmitted from a device(master) on the operator side for operating the robot to a robot (slave) existing at a remote location to control the motion of the robot.

A method for capturing the movement of the operator include: (1) a method using an exoskeleton-type device; (2) a method using a marker; and (3) a method using an image. The method (1) is a method in which an operator wears a mechanical mechanism to acquire the movement. The method (2) is a method for estimating the posture of the operator on the basis of the movement of the marker attached to the operator. The method (3) is a method for estimating the posture of the operator by estimating the skeleton of the operator from the image.

In the remote-operated robot, by matching of the movement of the robot to the movement of the operator captured as described above, the operator can perform various tasks through remote operation. When the robot manipulates an object at a remote location or comes into contact with an object in the surroundings, a technology for providing haptic feedback is often used so that the operator who performs remote operation grasps the feel of the robot. Furthermore, the technology for providing haptic feedback is also beginning to be used in the fields of virtual reality (VR), augmented reality (AR), and the like to improve the sense of immersion.

In order to provide haptic feedback, the master (input device) used by the operator needs to be fed back a reaction force or a displacement being received by the slave(robot, VR avatar, etc.) from the environment as information on the slave side. Therefore, input devices with haptic feedback functions are generally used, and most of them are either of two types: exoskeleton-type devices and glove-type devices.

Among the exoskeleton-type devices, for example, there is one that provides a sense of touch by applying pneumatic pressure to a fingertip and a palm, for example. This device has high spatial and haptic resolution, but is heavy and expensive and requires many peripheral devices. Moreover, being of the exoskeleton type, the device may interfere with the surroundings, and restrict the movement of a hand or a finger due to its structure covering the hand and fingertip.

There is also an exoskeleton-type device that provides force feedback by applying force to each finger with a motor. This device is also relatively heavy and expensive, and may interfere with the surroundings and restrict the movement of a hand or a finger. Moreover, since force feedback is provided to each finger, spatial resolution is low.

On the other hand, among the glove-type devices, there is one that vibrates each finger when the operation target comes into contact with the environment. This device feeds back only information on whether or not contact has been made, and cannot provide force feedback. Moreover, the device, being of the glove type, may cause discomfort to the operator and restrict the movement of the finger.

As described above, the conventional input devices with haptic feedback functions increase in technical difficulty as the spatial and haptic resolution increases, and hence the input devices require large space and peripheral devices, become expensive, and may hinder the natural movement of the operator.

On the other hand, in recent years, as devices that do not restrict the movement of a person, wristband-type devices have been developed to estimate the movement of the person's body by acquiring displacement and electrical signals of muscles, nerves, and the like, and further, actively move the person's body or transmit sensations by providing electrical signals.

Therefore, in the technology according to the present disclosure, it is possible to realize haptic feedback that does not hinder the movement of the operator.

2. Overview of Technology According to Present Disclosure (Configuration Example of Remote Operation System)

FIG. 1 is a diagram illustrating a configuration example of a remote operation system to which the technology according to the present disclosure is applicable.

The remote operation system in FIG. 1 is configured to include an input device 10 and an operation target 20.

The input device 10 is a form of an information processing apparatus to which the technology according to the present disclosure is applied.

The input device 10 has, for example, a wristband shape wound around an arm of an operator OP, who is a user, and includes a plurality of electrodes and a plurality of optical distance sensors on the side facing the arm. The input device 10 can move the finger of the operator OP regardless of his or her intention by detecting the displacement of the muscle and stimulating the muscle of the arm through the electrode. That is, the input device 10 is configured as an electrical stimulation apparatus.

The operation target 20 is configured as, for example, a remote-operated robot existing at a remote location away from a place where the input device 10 (operator OP) exists. The input device 10 and the operation target 20 perform wired communication or wireless communication with each other via a network such as the Internet, for example.

The input device 10 receives, as an input, the extension or contraction of the muscle of the body site of the operator OP, who is the user, and controls the motion of the operation target 20 on the basis of a control amount corresponding to the extension or contraction of the muscle.

The operation target 20 moves on the basis of the control amount from the input device 10, and supplies the input device 10 with change information indicating a change in physical quantity corresponding to the extension or contraction of the muscle of the body site of the operator OP.

The change in physical quantity is a reaction force received from the environment as the operation target 20 moves, a displacement of an action unit on which the reaction force acts in the operation target 20, or the like. The operation target 20 may be an object existing in real space (the real world) or an object created in virtual space. Therefore, the change in physical quantity related to the operation target 20 may be a reaction force or a displacement received by the operation target 20 in real space, or may be a reaction force or a displacement received by the operation target 20 in virtual space.

The input device 10 calculates the extension/contraction amount of the muscle corresponding to the change in physical quantity (reaction force or displacement) related to the operation target 20 on the basis of the change information supplied from the operation target 20. The input device 10 inputs stimulation to the muscle on the basis of the calculated extension/contraction amount. The stimulation to the muscle is, for example, electrical stimulation.

Such a configuration makes it possible to provide haptic feedback in a pseudo manner by stimulating the muscle of the operator OP.

(Principle Used in Technology According to Present Disclosure)

A principle used in the technology according to the present disclosure will be described with reference to FIGS. 2A and 2B. Here, a case where a person touches an object C1 in the surroundings with his or her index finger will be described as an example. However, the object C1 is assumed to be fixed.

Figures 2A, 2B:
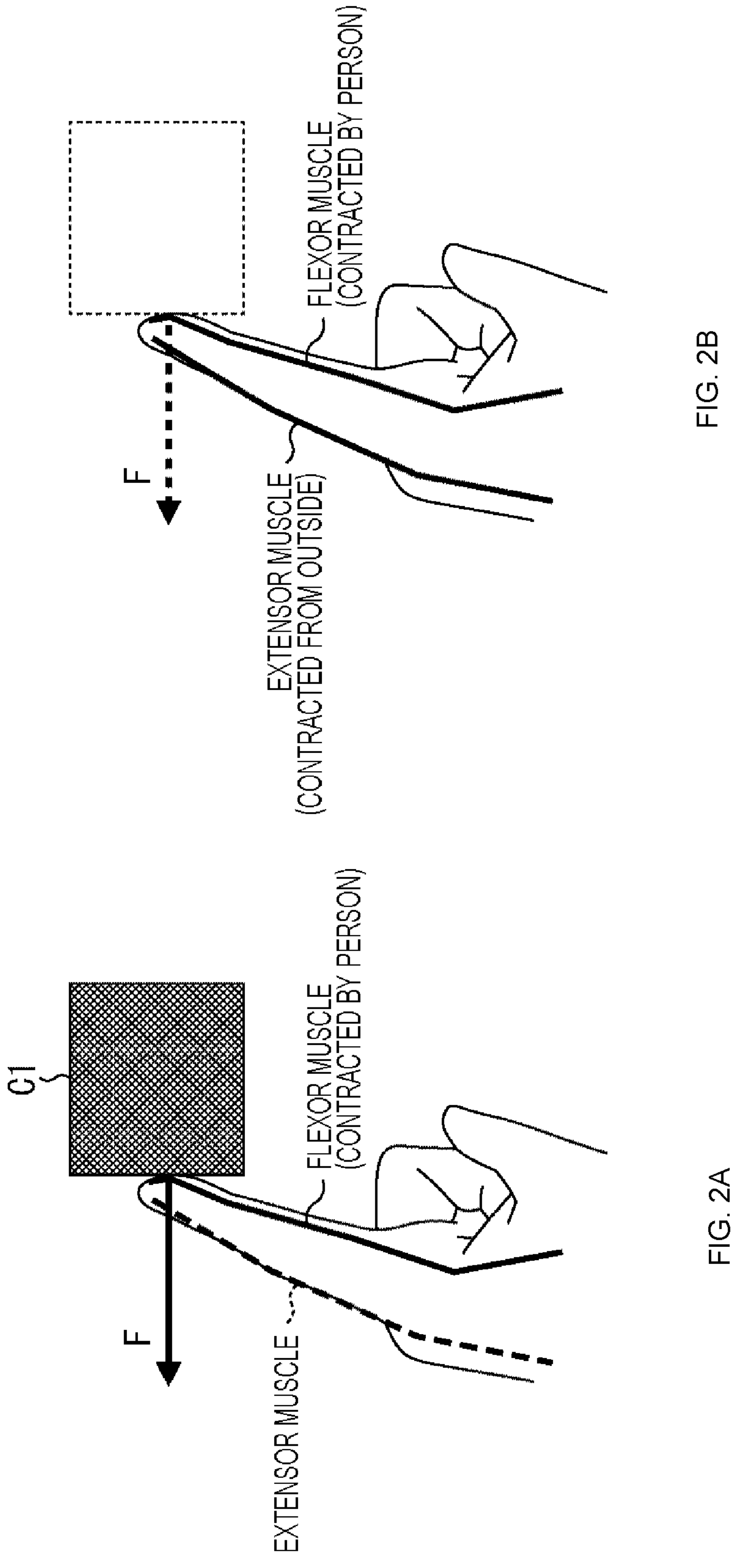
FIGS. 2A and 2B are diagrams for explaining a principle used in the technology according to the present disclosure.

As illustrated in FIG. 2A, when the person contracts the flexor muscle of the index finger and the index finger comes into contact with the object C1, the index finger receives a reaction force F from the object C1. At this time, the person uses only the flexor muscle and does not use the extensor muscle, but the index finger is immobile due to the force balance created by the reaction force F from the object C1. The flexor and extensor muscles are muscles that move opposite to each other, and such a pair of muscles are called antagonistic muscles.

On the other hand, as illustrated in B of FIG. 2B, when the person contracts the extensor muscle from the outside while contracting the flexor muscle of the index finger similarly to FIG. 2A, the load on the flexor muscle increases, and the index finger stops due to the balance of forces. At this time, the movement of the index finger in FIG. 2B becomes equivalent to that in FIG. 2A by applying stimulation corresponding to the contraction amount that corresponds to the reaction force F in FIG. 2A to the extensor muscle. That is, in FIG. 2B, the index finger is immobile even though the object C1 does not exist in the surroundings, and it is possible to provide a sensation as if the index finger touches an invisible object.

The technology according to the present disclosure proposes three methods for providing haptic feedback in a pseudo manner by creating a sensation of touching an object, using the principle described above.

In the following three methods, change information corresponding to the extension or contraction of at least one of the antagonistic muscles forming the pair is acquired, the extension/contraction amount of at least one of the antagonistic muscles is calculated on the basis of the change information, and stimulation corresponding to the extension/contraction amount is input to the antagonistic muscle of the operator OP.

Method 1: A reaction force being received by an operation target (e.g., remote-operated robot) from the environment and a position (displacement) of an action unit on which the reaction force acts are converted into an extension/contraction amount of each antagonistic muscle of the finger or the wrist of the operator OP. Then, by extending or contracting each antagonistic muscle by the extension/contraction amount, the reaction force and displacement being received by the operation target are fed back to the operator OP.

Method 2: The reaction force being received by the operation target from the environment is converted into an extension/contraction amount of a muscle acting in the same direction as the reaction force out of the antagonistic muscles of the finger or the wrist of the operator OP. Then, by extending or contracting the muscle out of the antagonistic muscles by the extension/contraction amount, the reaction force being received by the operation target is fed back to the operator OP.

Method 3: The position (displacement) of the action unit on which the reaction force being received by the operation target from the environment acts is converted into the extension/contraction amount of the muscle acting in the same direction as the reaction force out of the antagonistic muscles of the finger or the wrist of the operator OP. Then, by extending or contracting the muscle out of the antagonistic muscles by the extension/contraction amount, the displacement of the action unit of the operation target is fed back to the operator OP.

Hereinafter, embodiments of a remote operation system to which the three methods described above are applied will be described.

3. FIRST EMBODIMENT

Figures 3A, 3B, 3C:
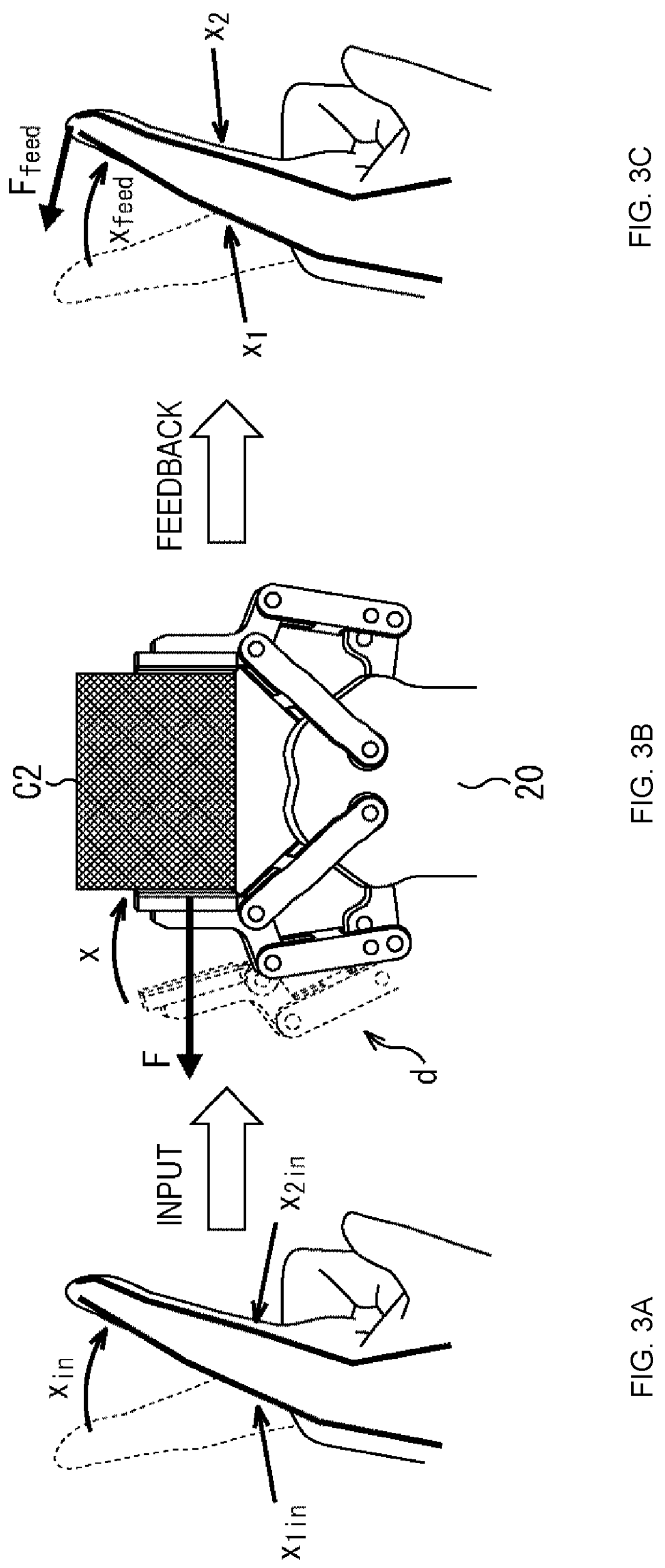
FIGS. 3A, 3B, and 3C are diagrams for explaining reaction force/displacement feedbacks.

FIGS. 3A, 3B, and 3C are diagrams for explaining the reaction force/displacement feedbacks in Method 1 described above.

In Method 1, as illustrated in A of FIG. 3A, the motion of the operation target 20 (robot) is controlled by the input device 10, using the lengths (extension/contraction amounts) x1in, x2in of the antagonistic muscles (extensor and flexor muscles) when the operator OP actively moves the index finger. The relationship between the lengths x1in, x2in of the antagonistic muscles and a control amount xin input to the operation target 20 is defined as xin=e(x1in, x2in).

In accordance with the control amount xin input from the input device 10, as illustrated in FIG. 3B, the operation target 20 grasps an object C2 by the drive of a robot hand-shaped drive unit d. At this time, the reaction force F and a displacement x being received by the drive unit d from the environment are measured, and are then acquired by the input device 10.

In the input device 10, the reaction force F and the displacement x acquired from the operation target 20 are converted into a pseudo reaction force $F_{feed}$ and a pseudo displacement $X_{feed}$ that are applied in a pseudo manner to the index finger of the operator OP. Then, the extension/contraction amounts $x_1$, $x_2$ of the antagonistic muscles in a case where the operator OP actually receives a pseudo reaction force $F_{feed}$ and a pseudo displacement $X_{feed}$ are calculated. The input device 10 inputs stimulations for contracting the antagonistic muscles of the index finger by the calculated extension/contraction amounts $x_1$, $x_2$ to the respective antagonistic muscles.

In this manner, the reaction force F and the displacement x being received by the operation target 20 are fed back to the operator OP.

FIG. 4 is a block diagram illustrating a functional configuration example of the input device 10 that realizes the reaction force/displacement feedbacks described with reference to FIGS. 3A, 3B, and 3C.

As illustrated in FIG. 4, the input device 10 includes a sensor 111, an extension/contraction amount measurement unit 112, a control amount calculation unit 113, a feedback (FB) information acquisition unit 114, an extension/contraction amount calculation unit 115, a stimulation input unit 116, and an electrode 117.

The sensor 111 is configured as a plurality of optical distance sensors. For example, the sensor 111 acquires a sensor value corresponding to the displacements of the antagonistic muscles of the index finger of the operator OP, and supplies the sensor values to the extension/contraction amount measurement unit 112.

The extension/contraction amount measurement unit 112 measures the extension/contraction amounts $x_{1in}$, $x_{2in}$ of the antagonistic muscles on the basis of the sensor values from the sensor 111. The measured extension/contraction amounts $x_{1in}$, $x_{2in}$ are supplied to the control amount calculation unit 113.

The control amount calculation unit 113 calculates the control amount $x_{in}$ to be input to the operation target 20, using the extension/contraction amounts $x_{1in}$, $x_{2in}$ from the extension/contraction amount measurement unit 112. The calculated control amount $x_{in}$ is supplied to the operation target 20.

Meanwhile, the operation target 20 includes a drive control unit 121, a drive unit 122, and a reaction force/displacement measurement unit 123.

The drive control unit 121 controls the drive of the drive unit 122 on the basis of the control amount $x_{in}$ from the input device 10.

The drive unit 122 is configured in a robot hand shape, for example, and performs manipulation of an object, such as gripping a predetermined object, under the control of the drive control unit 121.

The reaction force/displacement measurement unit 123 is configured as, for example, sensors attached to the drive unit 122, and measures the reaction force F and the displacement x received by the drive unit 122 by the drive of the drive unit 122. The measured reaction force F and displacement x are supplied to the input device 10 as change information indicating changes in physical quantity related to the operation target 20.

Returning to the description of the input device 10, the FB information acquisition unit 114 acquires the reaction force F and the displacement x supplied as the change information from the operation target 20, and converts the reaction force F and the displacement x into the pseudo reaction force $F_{feed}$ and the pseudo displacement $X_{feed}$ to be applied the index finger of the operator OP. The pseudo reaction force $F_{feed}$ and the pseudo displacement $X_{feed}$ are supplied to the extension/contraction amount calculation unit 115. The extension/contraction amount calculation unit 115 calculates the extension/contraction amounts $x_1$, $x_2$ of the antagonistic muscles on the basis of the pseudo reaction force $F_{feed}$ and the pseudo displacement $X_{feed}$ from the FB information acquisition unit 114. The calculated extension/contraction amounts $x_1$, $x_2$ are supplied to the stimulation input unit 116.

The stimulation input unit 116 generates electrical stimulation signals corresponding to the extension/contraction amounts $x_1$, $x_2$ from the extension/contraction amount calculation unit 115 to input stimulations for contracting the antagonistic muscles of the index finger by the extension/contraction amounts $x_1$, $x_2$ via the electrode 117.

The electrode 117 is provided so as to be in contact with a site away from a site to be extended and contracted in the body of the operator OP. Specifically, the electrode 117 is provided so as to be in contact with the forearm away from each finger of the operator OP, and applies an electrical stimulation to the forearm of the operator OP according to the electrical stimulation signal generated by the stimulation input unit 116.

Figure 5:
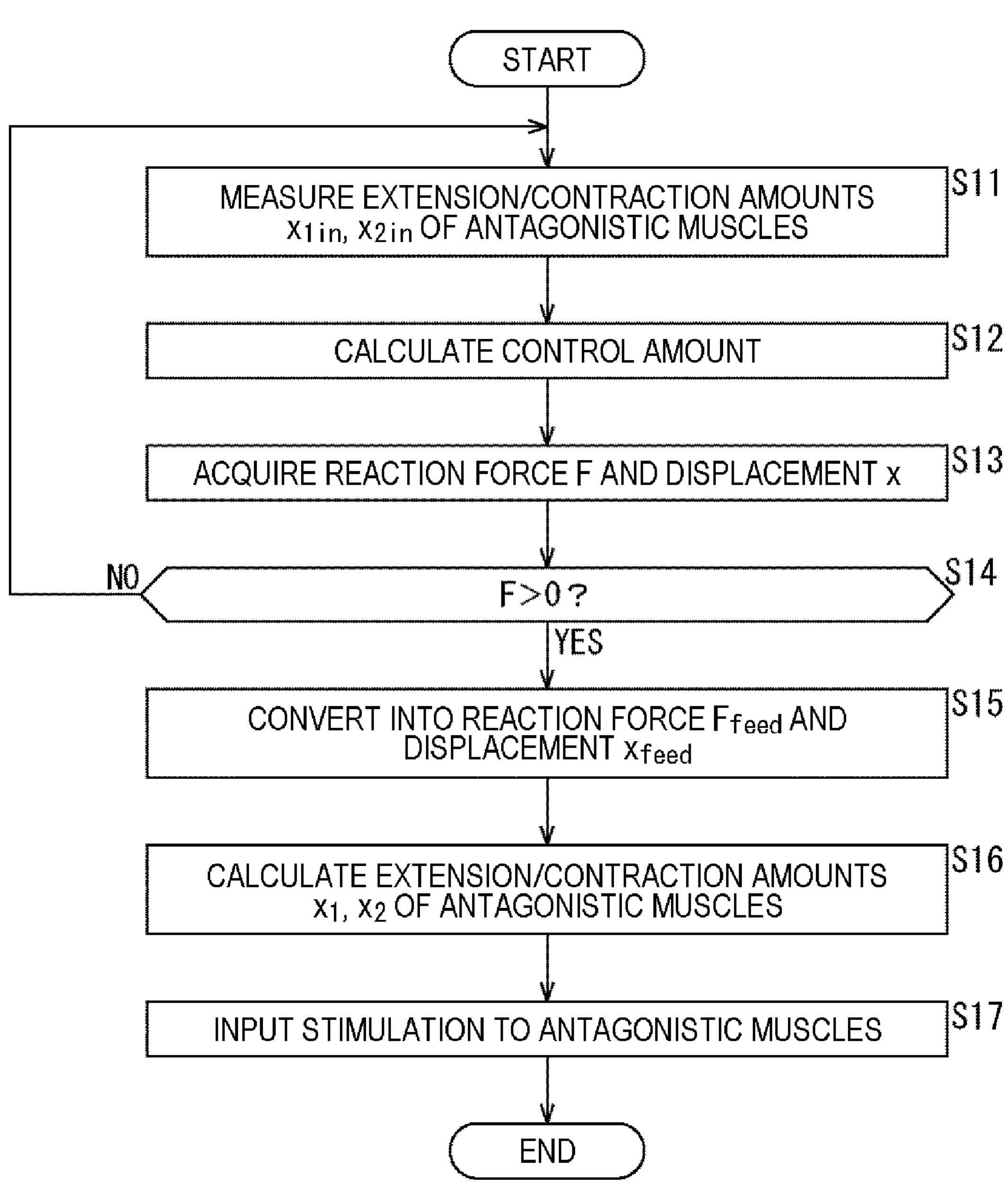
FIG. 5 is a flowchart for explaining the flow of the reaction force/displacement feedbacks.

Next, the flow of the reaction force/displacement feedbacks from the operation target 20 by the input device 10 will be described with reference to a flowchart of FIG. 5.

In step S11, the extension/contraction amount measurement unit 112 measures extension/contraction amounts $x_{1in}$, $x_{2in}$ of the antagonistic muscles on the basis of the sensor value from the sensor 111.

In step S12, the control amount calculation unit 113 calculates a control amount $x_{in}$ to be input to the operation target 20, using the extension/contraction amounts $x_{1in}$, $x_{2in}$ from the extension/contraction amount measurement unit 112. The calculated control amount $x_{in}$ is supplied to the operation target 20, and the drive unit 122 of the operation target 20 is driven accordingly.

In step S13, the FB information acquisition unit 114 acquires, from the operation target 20, a reaction force F and a displacement x received by the drive unit 122 measured by the reaction force/displacement measurement unit 123.

In step S14, the FB information acquisition unit 114 determines whether or not the reaction force F acquired from the operation target 20 satisfies F>0 (the reaction force F has been generated).

In a case where it is determined that F>0 is not satisfied, that is, in a case where the reaction force F to be received by the drive unit 122 has not been generated, the process returns to step S11, and the subsequent processes are repeated. On the other hand, in a case where it is determined that F>0, the process proceeds to step S15.

In step S15, the FB information acquisition unit 114 converts the reaction force F and the displacement x acquired from the operation target 20 into a pseudo reaction force $F_{feed}$ and a pseudo displacement $X_{feed}$ to be feedback values to the operator OP. The pseudo reaction force $F_{feed}$ and the pseudo displacement $X_{feed}$ are expressed by the following equations using sensitivity coefficients $k_F$, $k_X$ that indicate the degrees of amplification/attenuation of the feedback amounts of the reaction force F and the displacement x.

$$F_{feed}=k_F F$$

$$X_{feed}=k_X x$$

In step S16, the extension/contraction amount calculation unit 115 calculates the extension/contraction amounts $x_1$, $x_2$ of the antagonistic muscles on the basis of the pseudo reaction force $F_{feed}$ and the pseudo displacement $X_{feed}$ converted by the FB information acquisition unit 114. Here, the pseudo reaction force $F_{feed}$ and the pseudo displacement $X_{feed}$ are expressed by the functions of the extension/contraction amounts $x_1$, $x_2$ of the antagonistic muscles, and are defined by the following equations.

$$F_{feed}=g(x_1,x_2)$$

$$X_{feed}=f(x_1,x_2)$$

From the two expressions described above, the extension/contraction amounts $x_1$, $x_2$ of the antagonistic muscles are obtained as the functions of the pseudo reaction force $F_{feed}$ and the pseudo displacement $X_{feed}$. When functions g, f are linearly independent, the extension/contraction amounts $x_1$, $x_2$ are obtained independently.

In step S17, the stimulation input unit 116 inputs stimulation to the antagonistic muscles via the electrode 117 on the basis of the extension/contraction amounts $x_1$, $x_2$ calculated by the extension/contraction amount calculation unit 115.

Note that, in a case where F>0 is not satisfied (the reaction force F has not been generated), the extension/contraction amounts $x_1$, $x_2$ of the antagonistic muscles are the measured extension/contraction amounts $x_{1in}$, $x_{2in}$ themselves, and no stimulation is input to the antagonistic muscles.

According to the above processes, the extension/contraction amount of the antagonistic muscle corresponding to the reaction force F and the displacement x being received by the operation target 20 is calculated, and stimulation corresponding to the extension/contraction amount is input to the antagonistic muscle, whereby the reaction force F and the displacement x being received by the operation target 20 are fed back to the operator OP. As a result, even when an exoskeleton-type device, a glove-type device, or the like is not worn, it is possible to provide a sensation as if the finger of the operator OP is touching an invisible object, and to realize haptic feedback that does not hinder the movement of the operator OP.

4. SECOND EMBODIMENT

Figures 6A, 6B, 6C:
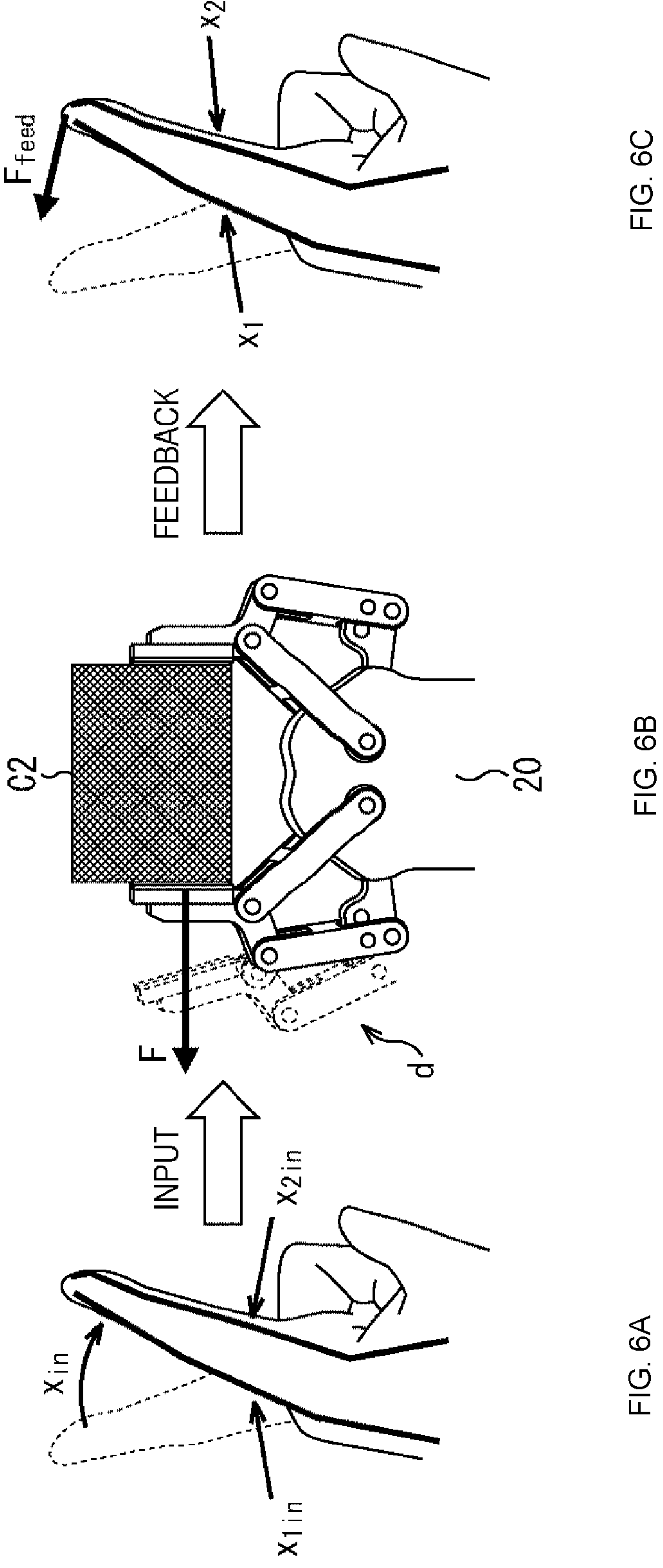
FIGS. 6A, 6B, and 6C are diagrams for explaining a reaction force feedback.

FIGS. 6A, 6B, and 6C are diagrams for explaining the reaction force feedback in Method 2 described above.

In Method 2 as well, as illustrated in A of FIG. 6A, the motion of the operation target 20 (robot) is controlled by the input device 10, using lengths (extension/contraction amounts) x1in, x2in of the antagonistic muscles (extensor and flexor muscles) when the operator OP intentionally moves the index finger. The relationship between the lengths x1in, x2in of the antagonistic muscles and a control amount xin input to the operation target 20 is defined as xin=e(x1in, x2in).

Here, in a case where the operator OP moves the index finger, one of the antagonistic muscles (extensor and flexor muscles) contracts, so that the finger moves. For example, in a case where the flexor muscle contracts and a change amount $\Delta x_{2in}$ of the length $x_{2in}$ of the flexor muscle becomes a negative value($\Delta x_{2in}<0$), the operator OP is bending the finger.

In accordance with the control amount xin input from the input device 10, as illustrated in FIG. 6B, the operation target 20 grasps an object C2 by the drive of a robot hand-shaped drive unit d. At this time, a reaction force F being received by the drive unit d from the environment is measured, and the measured reaction force F is acquired by the input device 10.

In the input device 10, the reaction force F acquired from the operation target 20 is converted into a pseudo reaction force $F_{feed}$ that is applied in a pseudo manner to the index finger of the operator OP. Then, the extension/contraction amount $x_1$ or $x_2$ of the antagonistic muscle in a case where the operator OP actually receives the pseudo reaction force $F_{feed}$ is calculated. Here, the extension/contraction amount of the muscle that was not contracted by the motion of the operator OP out of the antagonistic muscles (extensor and flexor muscles) is calculated. Then, the input device 10 inputs stimulation to the non-contracted antagonistic muscle to contract the antagonistic muscle by the calculated extension/contraction amount $x_1$ or $x_2$.

In this manner, the reaction force F being received by the operation target 20 is fed back to the operator OP.

Figure 7:
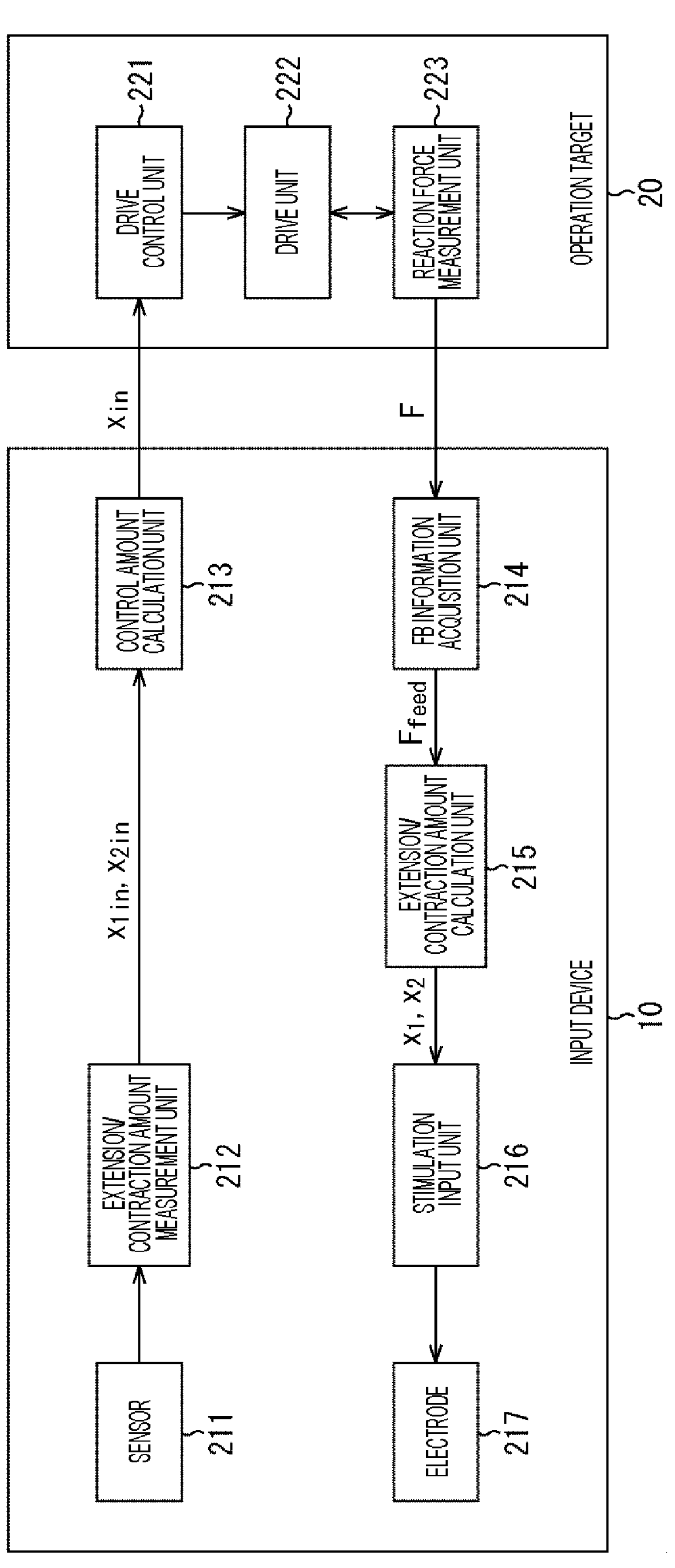
FIG. 7 is a block diagram illustrating a functional configuration example of an input device according to a second embodiment.

FIG. 7 is a block diagram illustrating a functional configuration example of the input device 10 that realizes the reaction force feedback described with reference to FIGS. 6A, 6B, and 6C.

As illustrated in FIG. 7, the input device 10 includes a sensor 211, an extension/contraction amount measurement unit 212, a control amount calculation unit 213, an FB information acquisition unit 214, an extension/contraction amount calculation unit 215, a stimulation input unit 216, and an electrode 217.

Note that the sensor 211, the extension/contraction amount measurement unit 212, the control amount calculation unit 213, the FB information acquisition unit 214, the extension/contraction amount calculation unit 215, the stimulation input unit 216, and the electrode 217 in FIG. 7 have functions similar to those of the sensor 111, the extension/contraction amount measurement unit 112, the control amount calculation unit 113, the FB information acquisition unit 114, the extension/contraction amount calculation unit 115, the stimulation input unit 116, and the electrode 117 in FIGS. 3A, 3B, and 3C, respectively, and hence the description thereof is omitted.

However, the FB information acquisition unit 214 differs from the FB information acquisition unit 114 in that only the reaction force F supplied from the operation target 20 is acquired and converted into the pseudo reaction force $F_{feed}$ to be applied the index finger of the operator OP.

Furthermore, among a drive control unit 221, a drive unit 222, and a reaction force measurement unit 223 included in the operation target 20 in FIG. 7, the drive control unit 221 and the drive unit 222 have functions similar to those of the drive control unit 121 and the drive unit 122 in FIGS. 3A, 3B, and 3C, and hence the description thereof is omitted.

The reaction force measurement unit 223 measures the reaction force F received by the drive unit 222 by the drive of the drive unit 222. The measured reaction force F is supplied to the input device 10 as change information indicating the change in physical quantity related to the operation target 20.

Figure 8:
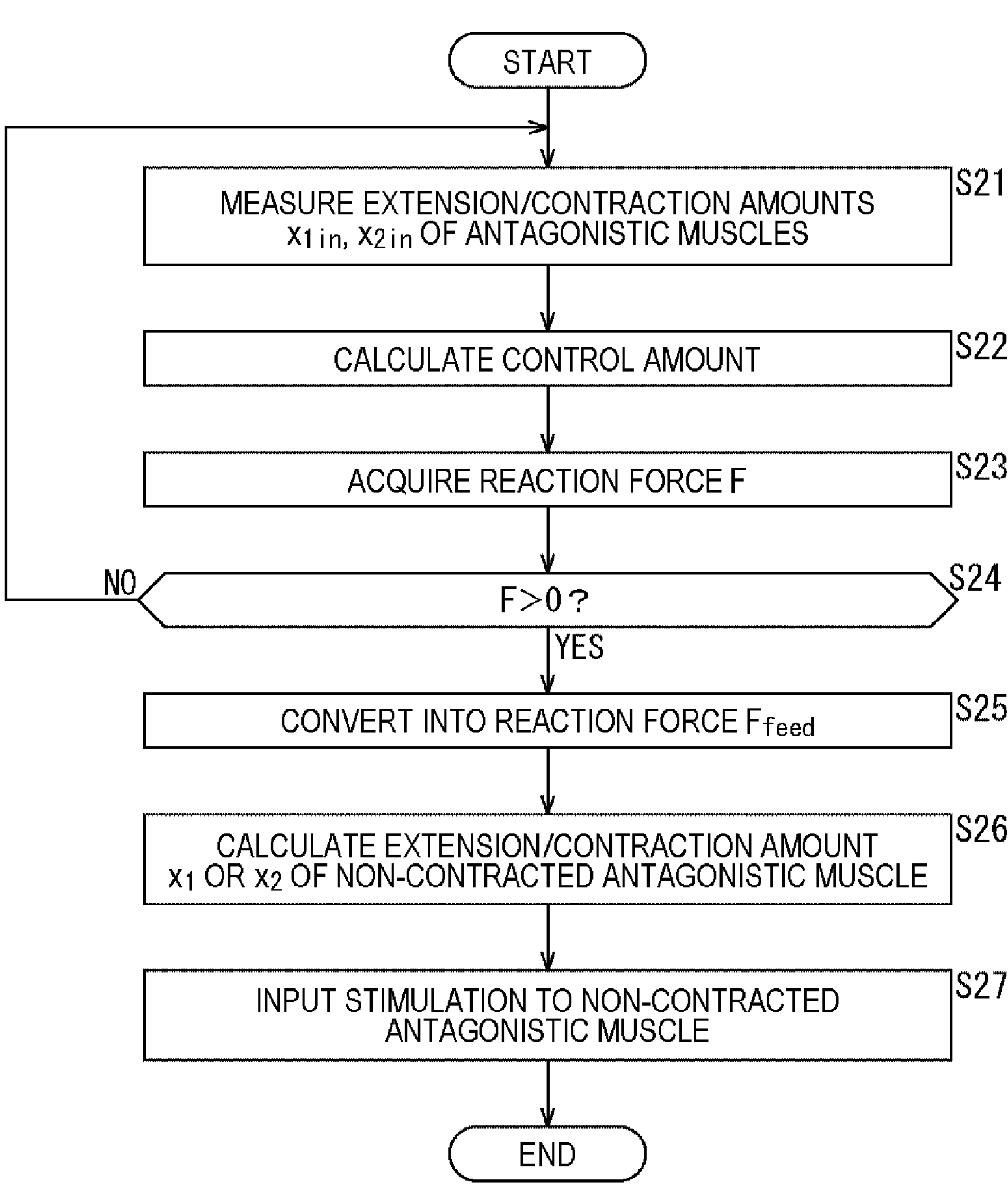
FIG. 8 is a flowchart for explaining the flow of the reaction force feedback.

Next, the flow of the reaction force feedback from the operation target 20 by the input device 10 will be described with reference to the flowchart of FIG. 8.

In step S21, the extension/contraction amount measurement unit 212 measures extension/contraction amounts $x_{1in}$, $x_{2in}$ of the antagonistic muscles on the basis of the sensor value from the sensor 211.

Here, which of the antagonistic muscles has contracted (the direction in which the operator OP has moved the finger) is also detected. For example, it is detected whether the extensor muscle has contracted and if the change amount of the length $x_{1in}$ of the extensor muscle has become $\Delta x_{1in}<0$ (the operator OP is extending the finger), or whether the flexor muscle has contracted and if the change amount of the length $x_{2in}$ of the flexor muscle has become $\Delta x_{2in}<0$ (the operator OP is bending the finger).

In step S22, the control amount calculation unit 213 calculates a control amount $x_{in}$ to be input to the operation target 20, using the extension/contraction amounts $x_{1in}$, $x_{2in}$ from the extension/contraction amount measurement unit 212. The calculated control amount $x_{in}$ is supplied to the operation target 20, and the drive unit 222 of the operation target 20 is driven accordingly.

In step S23, the FB information acquisition unit 214 acquires, from the operation target 20, a reaction force F received by the drive unit 222 measured by the reaction force measurement unit 223.

In step S24, the FB information acquisition unit 214 determines whether or not the reaction force F acquired from the operation target 20 satisfies F>0 (the reaction force F has been generated).

In a case where it is determined that F>0 is not satisfied, that is, in a case where the reaction force F received by the drive unit 222 has not been generated, the process returns to step S21, and the subsequent processes are repeated. On the other hand, in a case where it is determined that F>0, the process proceeds to step S25.

In step S25, the FB information acquisition unit 214 converts the reaction force F acquired from the operation target 20 into a pseudo reaction force $F_{feed}$ to be a feedback value to the operator OP. The pseudo reaction force $F_{feed}$ is expressed by the following equation using a sensitivity coefficient $k_F$ that indicates the degree of amplification/attenuation of the feedback amount of the reaction force F.

$$F_{feed}=k_F F$$

In step S26, the extension/contraction amount calculation unit 215 calculates the extension/contraction amount $x_1$ or $x_2$ of the non-contracted antagonistic muscle on the basis of the pseudo reaction force $F_{feed}$ converted by the FB information acquisition unit 214. Here, the pseudo reaction force $F_{feed}$ is represented by the function of the extension/contraction amounts $x_1$, $x_2$ of the antagonistic muscles and is defined by the following equation.

$$F_{feed}=g(x_1,x_2)$$

From the equation described above, the extension/contraction amount $x_1$ or $x_2$ of the non-contracted antagonistic muscle is expressed as follows using functions $h_1$, $h_2$ obtained from the function g.

In a case where $\Delta x_{2in}<0$ (in a case where the operator OP is bending the finger), $$x_1=h_1(x_{2in},F_{feed})$$

In a case where $\Delta x_{1in}<0$ (in a case where the operator OP is extending the finger), $$x_2=h_2(x_{1in},F_{feed})$$

In step S27, the stimulation input unit 216 inputs stimulation to the antagonistic muscle via the electrode 217 on the basis of the extension/contraction amount $x_1$ or $x_2$ of the non-contracted antagonistic muscle calculated by the extension/contraction amount calculation unit 215.

Note that the extension/contraction amount $x_1$ or $x_2$ of the contracting antagonistic muscle is the measured extension/contraction amount $x_{1in}$ or $x_2$ in itself, and no stimulation is input to the contracting antagonistic muscle.

According to the above processes, the extension/contraction amount of the non-contracting antagonistic muscle corresponding to the reaction force F being received by the operation target 20 is calculated, and stimulation corresponding to the extension/contraction amount is input to the non-contracting antagonistic muscle, whereby the reaction force F being received by the operation target 20 is fed back to the operator OP. As a result, even when an exoskeleton-type device, a glove-type device, or the like is not worn, it is possible to provide a sensation as if the finger of the operator OP is touching an invisible object, and to realize haptic feedback that does not hinder the movement of the operator OP.

5. THIRD EMBODIMENT

Figures 9A, 9B, 9C:
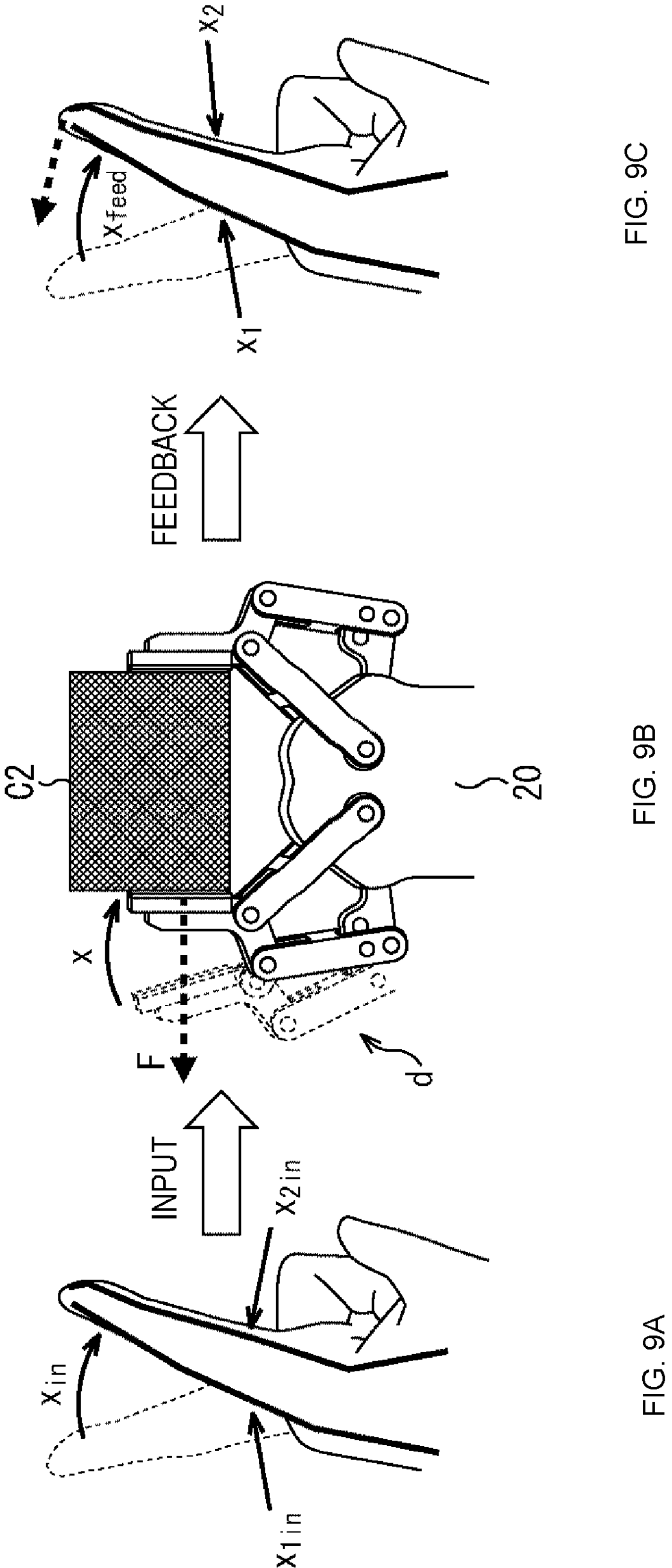
FIGS. 9A, 9B, and 9C are diagrams for explaining a displacement feedback.

FIGS. 9A, 9B, and 9C are diagrams for explaining the displacement feedback in Method 3 described above.

In Method 3 as well, as illustrated in A of FIG. 9A, the motion of the operation target 20 (robot) is controlled by the input device 10, using lengths (extension/contraction amounts) x1in, x2in of the antagonistic muscles (extensor and flexor muscles) when the operator OP intentionally moves the index finger. The relationship between the lengths x1in, x2in of the antagonistic muscles and a control amount xin input to the operation target 20 is defined as xin=e(x1in, x2in).

Here, in a case where the operator OP moves the index finger, one of the antagonistic muscles (extensor and flexor muscles) contracts, so that the finger moves. For example, in a case where the flexor muscle contracts and a change amount $\Delta x_{2in}$ of the length $x_{2in}$ of the flexor muscle becomes a negative value($\Delta x_{2in}<0$), the operator OP is bending the finger.

In accordance with the control amount xin input from the input device 10, as illustrated in FIG. 9B, the operation target 20 grasps an object C2 by the drive of a robot hand-shaped drive unit d. At this time, a reaction force F being received by the drive unit d from the environment is measured, and the measured reaction force F is acquired by the input device 10.

In the input device 10, a displacement x of the drive unit d is estimated from the reaction force F acquired from the operation target 20, and is converted into a pseudo displacement $X_{feed}$ that is applied in a pseudo manner to the index finger of the operator OP. Then, the extension/contraction amount $x_1$ or $x_2$ of the antagonistic muscle in a case where the operator OP actually receives the pseudo displacement $X_{feed}$ is calculated. Here, the extension/contraction amount of the muscle that was not contracted by the motion of the operator OP out of the antagonistic muscles (extensor and flexor muscles) is calculated. Then, the input device 10 inputs stimulation for contracting the non-contracted antagonistic muscle of the index finger by the calculated extension/contraction amount $x_1$ or $x_2$ to the antagonistic muscle.

In this manner, the displacement x being received by the operation target 20 is fed back to the operator OP.

Figure 10:
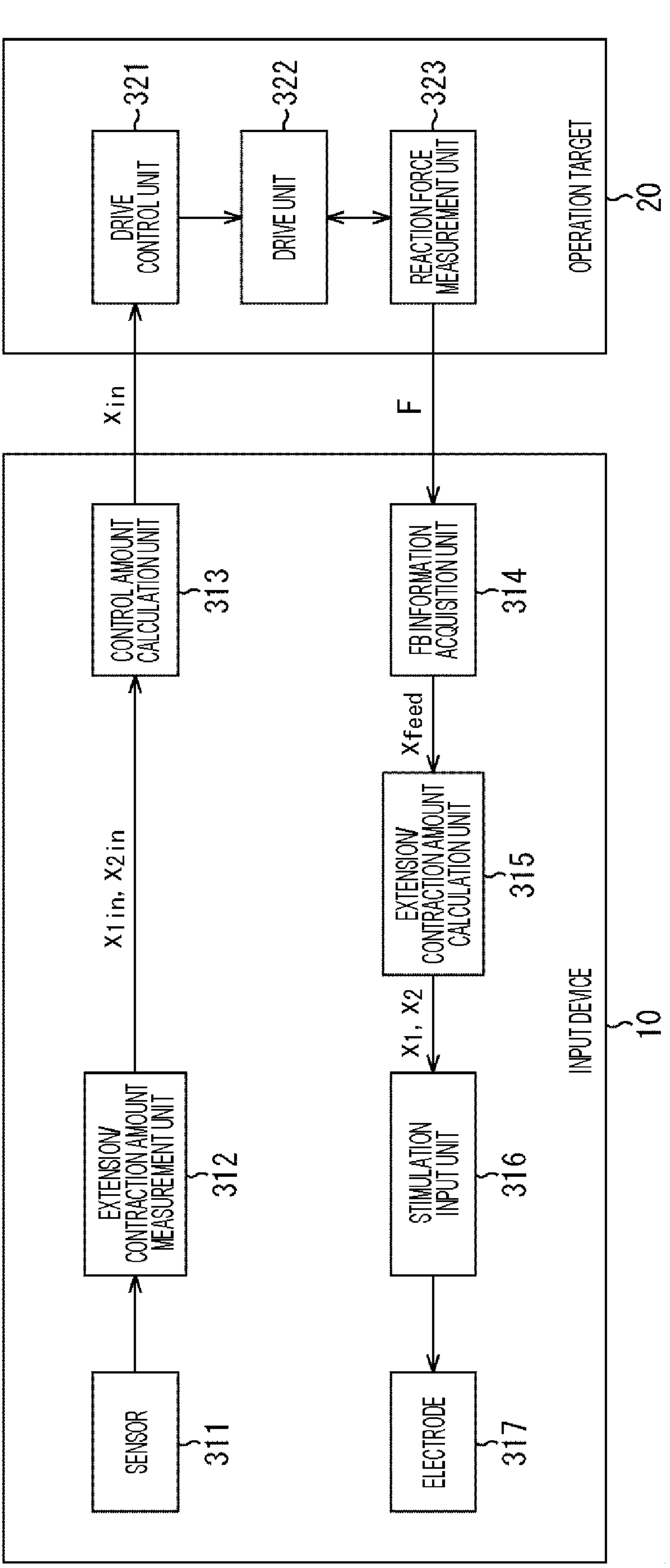
FIG. 10 is a block diagram illustrating a functional configuration example of an input device according to a third embodiment.

FIG. 10 is a block diagram illustrating a functional configuration example of the input device 10 that realizes the displacement feedback described with reference to FIGS. 9A, 9B, and 9C.

As illustrated in FIG. 10, the input device 10 includes a sensor 311, an extension/contraction amount measurement unit 312, a control amount calculation unit 313, an FB information acquisition unit 314, an extension/contraction amount calculation unit 315, a stimulation input unit 316, and an electrode 317.

Note that the sensor 311, the extension/contraction amount measurement unit 312, the control amount calculation unit 313, the FB information acquisition unit 314, the extension/contraction amount calculation unit 315, the stimulation input unit 316, and the electrode 317 in FIG. 10 have functions similar to those of the sensor 111, the extension/contraction amount measurement unit 112, the control amount calculation unit 113, the FB information acquisition unit 114, the extension/contraction amount calculation unit 115, the stimulation input unit 116, and the electrode 117 in FIGS. 3A, 3B, and 3C, respectively, and hence the description thereof is omitted.

However, the FB information acquisition unit 314 differs from the FB information acquisition unit 114 in that the displacement x is estimated by acquiring the reaction force F supplied from the operation target 20 and is converted into the pseudo displacement $X_{feed}$ to be applied the index finger of the operator OP.

Furthermore, a drive control unit 321, a drive unit 322, and a reaction force measurement unit 323 included in the operation target 20 in FIG. 10 have functions similar to those of the drive control unit 221, the drive unit 222, and the reaction force measurement unit 223 in FIG. 7, and hence the description thereof will be omitted.

Figure 11:
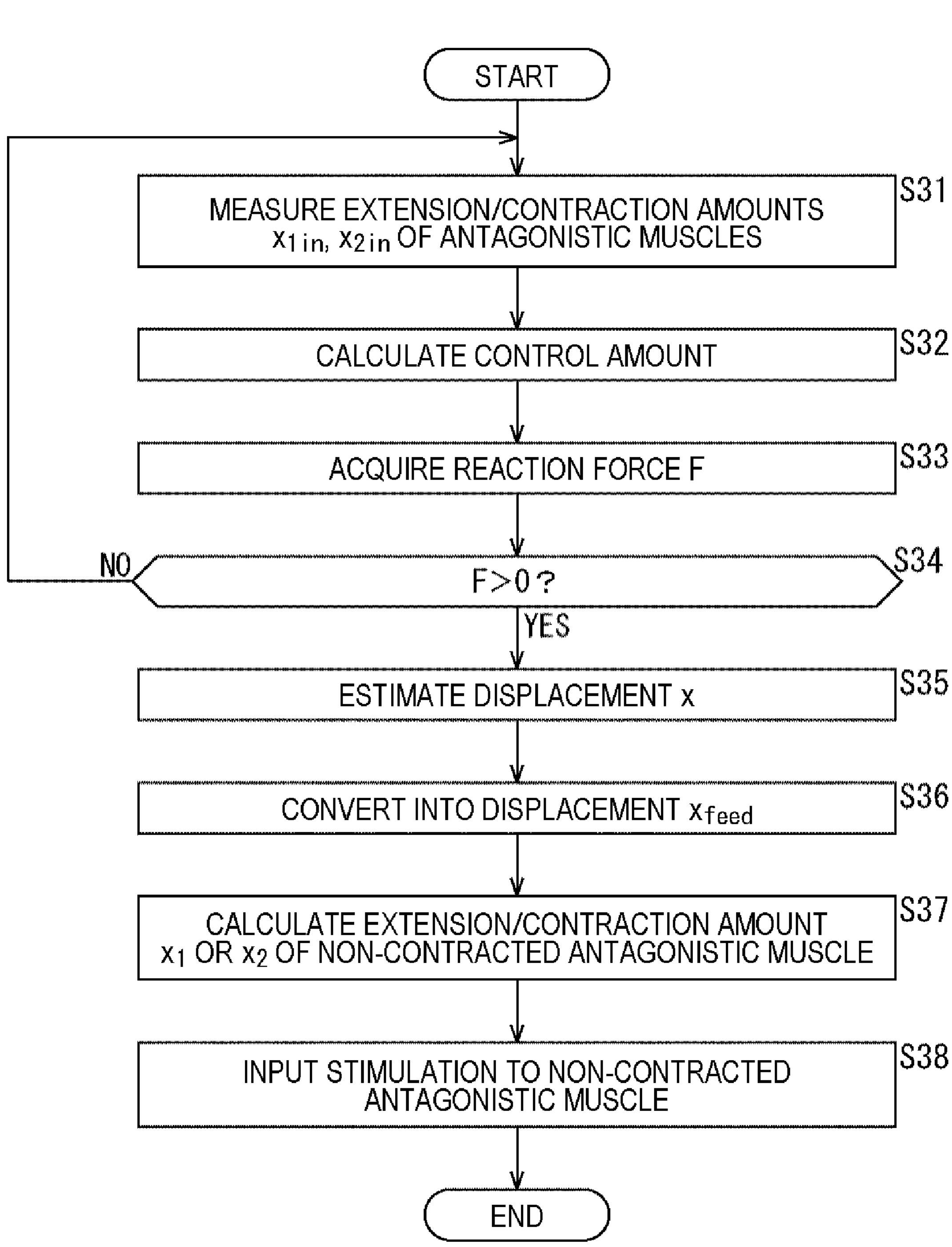
FIG. 11 is a flowchart for explaining the flow of the displacement feedback.

Next, the flow of the displacement feedback from the operation target 20 by the input device 10 will be described with reference to a flowchart of FIG. 11.

In step S31, the extension/contraction amount measurement unit 312 measures extension/contraction amounts $x_{1in}$, $x_{2in}$ of the antagonistic muscles on the basis of the sensor value from the sensor 311.

Here, which of the antagonistic muscles has contracted (the direction in which the operator OP has moved the finger) is also detected. For example, it is detected whether the extensor muscle has contracted and if the change amount of the length $x_{1in}$ of the extensor muscle has become $\Delta x_{1in}<0$ (the operator OP is extending the finger), or whether the flexor muscle has contracted and if the change amount of the length $x_{2in}$ of the flexor muscle has become $\Delta x_{2in}<0$ (the operator OP is bending the finger).

In step S32, the control amount calculation unit 313 calculates a control amount $x_{in}$ to be input to the operation target 20, using the extension/contraction amounts $x_{1in}$, $x_{2in}$ from the extension/contraction amount measurement unit 312. The calculated control amount $x_{in}$ is supplied to the operation target 20, and the drive unit 322 of the operation target 20 is driven accordingly.

In step S33, the FB information acquisition unit 314 acquires, from the operation target 20, a reaction force F received by the drive unit 322 measured by the reaction force measurement unit 323.

In step S34, the FB information acquisition unit 314 determines whether or not the reaction force F acquired from the operation target 20 satisfies F>0 (the reaction force F has been generated).

In a case where it is determined that F>0 is not satisfied, that is, in a case where the reaction force F received by the drive unit 322 has not been generated, the process returns to step S31, and the subsequent processes are repeated. On the other hand, in a case where it is determined that F>0, the process proceeds to step S35.

In step S35, the FB information acquisition unit 314 estimates a displacement x of the drive unit 322 on which the reaction force F acts in the operation target 20 from the reaction force F acquired from the operation target 20.

In step S36, the FB information acquisition unit 314 converts the estimated displacement x into a pseudo displacement $X_{feed}$ to be a feedback value to the operator OP. The pseudo displacement $X_{feed}$ is expressed by the following equation using a sensitivity coefficient $k_x$ that indicates the degree of amplification/attenuation of the feedback amount of the displacement x.

$$X_{feed}=k_X x$$

In step S37, the extension/contraction amount calculation unit 215 calculates the extension/contraction amount $x_1$ or $x_2$ of the non-contracted antagonistic muscle on the basis of the pseudo displacement $X_{feed}$ converted by the FB information acquisition unit 314. Here, the pseudo displacement $X_{feed}$ is represented by the function of the extension/contraction amounts $x_1$, $x_2$ of the antagonistic muscle and is defined by the following equation.

$$X_{feed}=f(x_1,x_2)$$

From the equation described above, the extension/contraction amount $x_1$ or $x_2$ of the non-contracted antagonistic muscle is expressed as follows using functions $h_1$, $h_2$ obtained from the function f.

In a case where $\Delta x_{2in}<0$ (in a case where the operator OP is bending the finger), $$x_1=h_1(x_{2in},F_{feed})$$

In a case where $\Delta x_{1in}<0$ (in a case where the operator OP is extending the finger), $$x_2=h_2(x_{1in},F_{feed})$$

In step S38, the stimulation input unit 316 inputs stimulation to the antagonistic muscle via the electrode 317 on the basis of the extension/contraction amount $x_1$ or $x_2$ of the non-contracted antagonistic muscle calculated by the extension/contraction amount calculation unit 315.

Note that the extension/contraction amount $x_1$ or $x_2$ of the contracting antagonistic muscle is the measured extension/contraction amount $x_{1in}$ or $x_{2in}$ itself, and no stimulation is input to the contracting antagonistic muscle.

According to the above processes, the extension/contraction amount of the non-contracting antagonistic muscle corresponding to the displacement x being received by the operation target 20 is calculated, and stimulation corresponding to the extension/contraction amount is input to the non-contracting antagonistic muscle, whereby the displacement x being received by the operation target 20 is fed back to the operator OP. As a result, even when an exoskeleton-type device, a glove-type device, or the like is not worn, it is possible to provide a sensation as if the finger of the operator OP is touching an invisible object, and to realize haptic feedback that does not hinder the movement of the operator OP.

Note that, in Method 3, the displacement x is estimated from the reaction force F acquired from the operation target 20, but the displacement x may be measured in the operation target 20, and the displacement x may be acquired from the operation target 20.

6. Workarounds for Interference Between Feedback and Operator Input

In the methods described above, in a case where feedback by electrical stimulation is provided while the operator OP is actively moving his or her finger or the like, it is conceivable that a feedback command by the input device 10 and a command to the finger based on the electrical activity of the muscle of the operator OP interfere with each other. That is, depending on the timing, feedback may be provided to the muscle that the operator OP is moving, rather than the muscle that the operator OP is not moving.

Figures 12A, 12B:
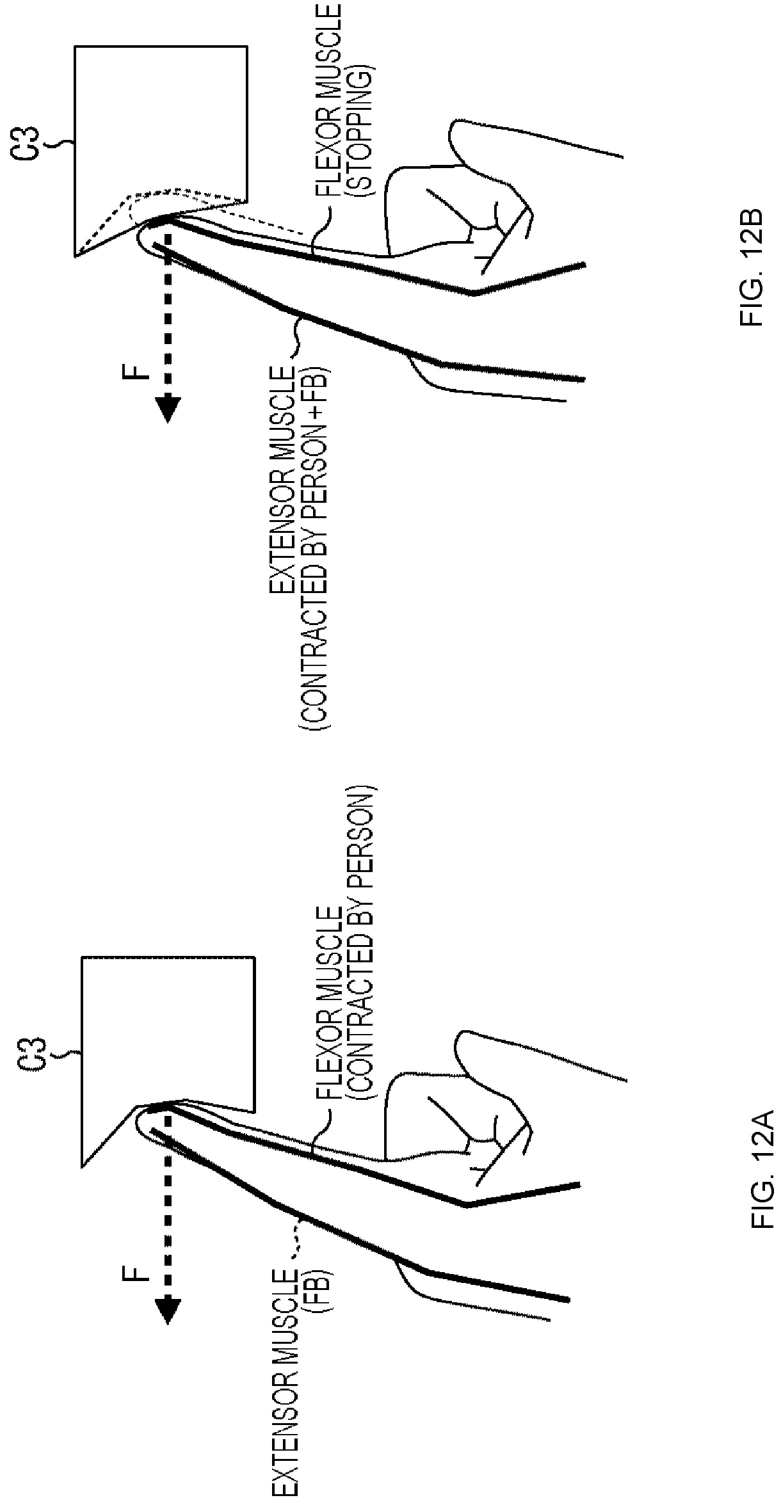
FIGS. 12A and 12B are diagrams for explaining interference between the feedback and the operator input.

For example, as illustrated in A of FIG. 12A, in a case where the operator OP (person) bends the finger using the flexor muscle, the reaction force F being received by the operation target 20 (robot) from the environment (object C3)

is fed back as stimulation to the extensor muscle. In a case where the operator OP attempts to extend the finger from this state, as illustrated in FIG. 9B, the contraction of the flexor muscle stops, and the previous feedback and an input by the operator OP are applied to the extensor muscle. That is, one muscle receives two systems of control inputs: an input from the outside and an input from the operator OP.

For such interference, the following three workarounds are conceivable.

(Workaround 1)

Even in a case where the operator OP attempts to actively move the muscle receiving the feedback command, the feedback until then is continuously provided. That is, even in a case where intentional extension or contraction of the muscle, to which the electrical stimulation is being input by the stimulation input unit, is detected, the input of the electrical stimulation to the muscle is continued.

In this case, the command from the operator OP and the electrical stimulation as the feedback command are simultaneously applied to the muscle. Therefore, it is easy to move the muscle in the direction of the feedback being applied, and in turn, the operator OP can move the muscle with less force. That is, the feedback functions as an assist of the motion of the operator OP.

(Workaround 2)

In a case where the operator OP attempts to actively move the muscle receiving the feedback command, the previous feedback is stopped. That is, in a case where intentional extension or contraction of the muscle, to which the electrical stimulation is being input by the stimulation input unit, is detected, the input of the electrical stimulation to the muscle is stopped.

In this case, every time the operator OP switches the direction of the motion of the muscle or joint, the feedback applied by the robot receiving the reaction force is instantaneously stopped.

(Workaround 3)

Figure 13:
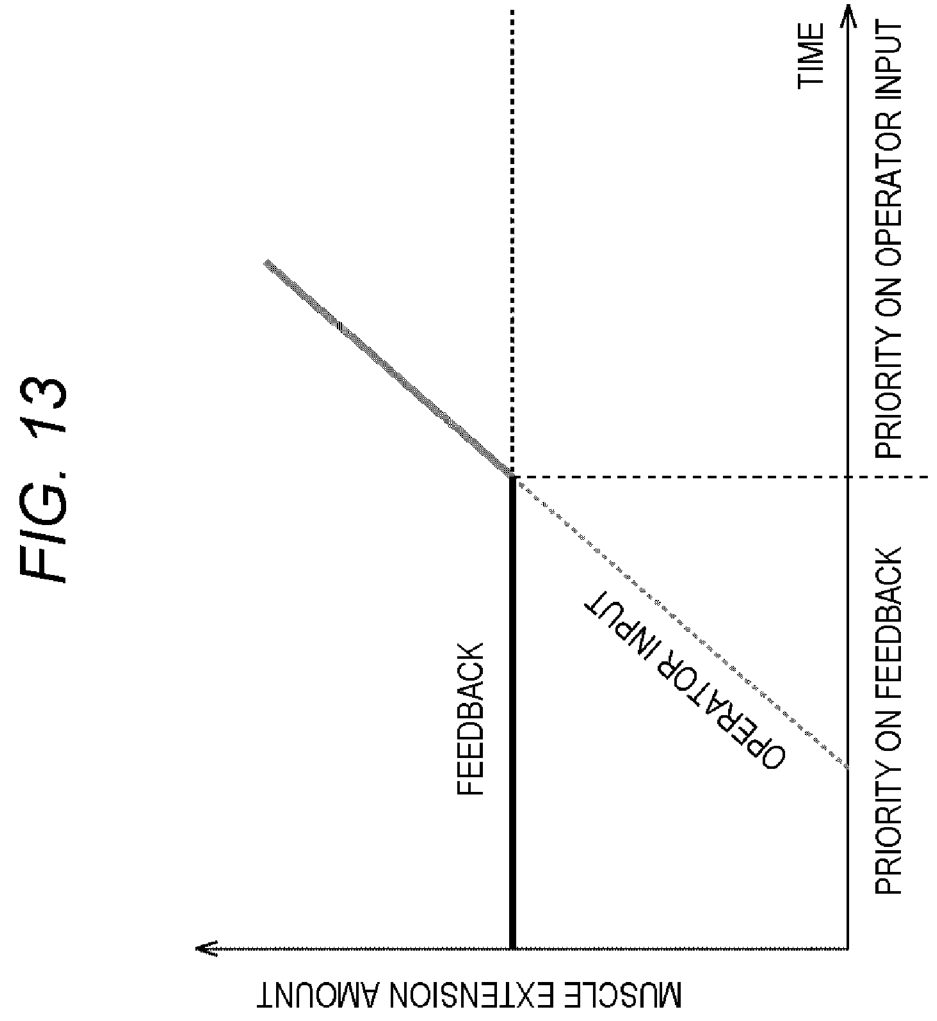
FIG. 13 is a diagram for explaining a switching between the feedback and the operator input.

In a case where the operator OP actively moves the muscle receiving the feedback command, as illustrated in FIG. 13, the feedback is stopped when the movement of the finger (the extension amount of the muscle) due to the operator input exceeds the range of movement due to the feedback. Furthermore, in a case where the movement of the finger (the extension amount of the muscle) due to the operator input is relatively small, the feedback is preferentially provided. That is, in a case where the extension/contraction amount due to intentional extension or contraction of the muscle, to which the electrical stimulation is being input by the stimulation input unit, exceeds a predetermined amount, the input of the electrical stimulation to the muscle is stopped.

In this case, in a case where the amount of movement due to the operator input exceeds the amount of movement due to the previous feedback, a switching is made from the feedback to the operator input, so that the feedback is not stopped instantaneously as in the Workaround 2 described above, and the reaction force is fed back more accurately.

7. Construction of Mapping Model

In order to provide the reaction force/displacement feedbacks using Method 1, 2, or 3 described above, it is necessary to associate the pseudo reaction force and the pseudo displacement to be applied the operator OP with the operator input (the extension/contraction amount of the antagonistic muscle). Hereinafter, two procedures for constructing a model for associating these will be described. The use of such a model makes it possible to calculate the extension/contraction amount of at least one of the antagonistic muscles.

(Model Construction Using Machine Learning)

Figure 14:
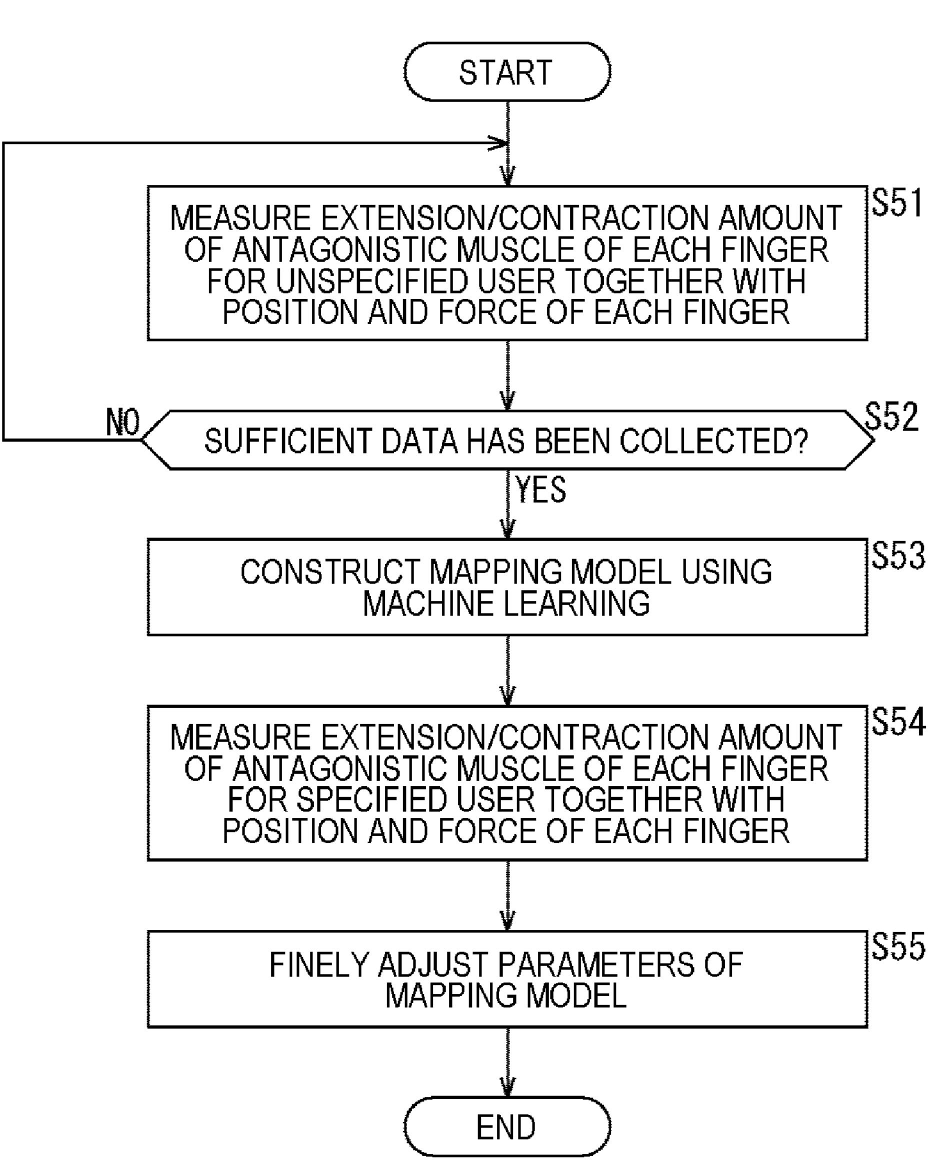
FIG. 14 is a flowchart illustrating a flow of construction of a mapping model.

A procedure for constructing a mapping model for uniquely converting the pseudo reaction force and the pseudo displacement to be applied the operator OP to the length (extension/contraction amount) of the antagonistic muscle or the like using machine learning will be described with reference to a flowchart of FIG. 14.

First, a general model is constructed. It is assumed here that the input to the mapping model is a feedback value (pseudo reaction force/pseudo displacement) of the reaction force/displacement, and the output is the control amount (antagonistic muscle length) for the operator OP to move the muscle. In general, in a case where there are two input variables and two output variables, mapping can be uniquely performed as $(F_{feed}, X_{feed}) \rightarrow (x_1, x_2)$.

In step S51, by causing an unspecified user to move the finger to be measured, the length (extension/contraction amount) of the antagonistic muscle of each finger is measured for the unspecified user together with the position and force of each finger. For example, a conventional wristband-type device or the like is used to measure the length of the antagonistic muscle.

The measurements are performed on users of various parameters such as age, height, and gender. That is, in step S52, it is determined whether or not sufficient data has been collected, and measurement for an unspecified user (step S51) is repeated until sufficient data can be collected.

In a case where sufficient data can be collected, a mapping model using machine learning is constructed in step S53. Specifically, the mapping model is constructed by a machine learning algorithm such as a neural network, using a large amount of collected data.

The general model is constructed in the above manner. Hereinafter, a model change for a specified user is performed.

In step S54, by causing the specified user to move the finger to be measured, the length (extension/contraction amount) of the antagonistic muscle of each finger is measured for the specified user together with the position and force of each finger as in step S51.

In step S55, a unique model suitable for a specified user is constructed by finely adjusting the parameters of the mapping model (general model), using the measurement result for the specified user. The mapping model constructed in this manner is used when reaction force/displacement feedbacks are provided to the user.

Note that the construction of the mapping model using the machine learning may be executed according to the physical quantity (reaction force or displacement) to be fed back, in other words, according to which of the methods described above is used.

(Model Construction Using Theoretical Equation)

A procedure for constructing a mapping model for uniquely converting the pseudo reaction force and the pseudo displacement to be applied the operator OP to the length (extension/contraction amount) of the antagonistic muscle or the like using a theoretical equation, such as polynomial approximation, will be described with reference to the flowchart of FIG. 15.

Figure 15:
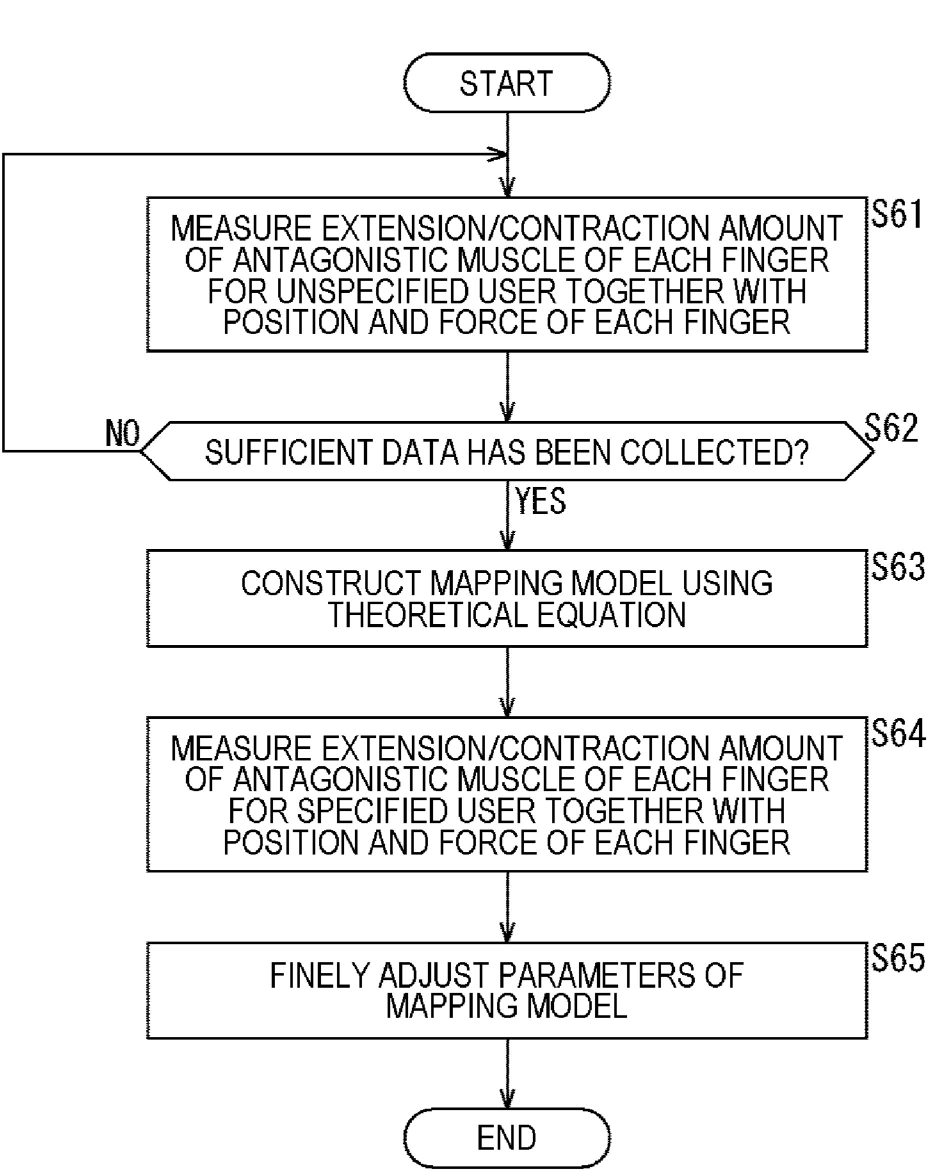
FIG. 15 is a flowchart illustrating a flow of construction of a mapping model.

Note that the procedure of steps S61 and S62 in FIG. 15 are similar to the procedure of steps S51 and S52 in FIG. 15, and hence the description thereof will be omitted.

That is, in a case where sufficient data can be collected, a mapping model using a theoretical equation is constructed in step S63. Specifically, a relationship between an input variable and an output variable in a large amount of collected data is expressed by a theoretical equation using polynomial approximation or the like. For example, assuming that the reaction force is a quadratic function of the extension/contraction amount of the antagonistic muscle and the displacement is a linear function of the extension/contraction amount of the antagonistic muscle, the following simultaneous equations are obtained.

$$F_{feed} = a(x_2 - x_1)^2 + b(x_2 - x_1) + c$$

$$X_{feed} = d(x_2 - x_1) + e$$

The general model is constructed in the above manner. Hereinafter, a model change for a specified user is performed.

In step S64, by causing the specified user to move the finger to be measured, the length (extension/contraction amount) of the antagonistic muscle of each finger is measured for the specified user together with the position and force of each finger as in step S61.

In step S65, a unique model suitable for a specified user is constructed by finely adjusting the parameters of the mapping model (general model), using the measurement result for the specified user. The mapping model constructed in this manner is used when reaction force/displacement feedbacks are provided to the user.

8. Examples of Calibration Method

In the model construction described above, it is necessary to collect a large amount of data regarding the input variable and the output variable of the mapping model. Hereinafter, examples of a calibration method for collecting the data will be described. Note that, in any of the following examples, it is assumed that a wristband-type device is used for measuring the extension/contraction amount of the antagonistic muscle and the like.

(1) Method Using Force Sensor

When the operator OP moves the finger, the reaction force and displacement received by the finger from the environment are measured. For the measurement of the reaction force, a force sensor (torque sensor) is used. The force sensor (torque sensor) is fixed in the environment, and the reaction force is measured when the operator OP actively applies an external force to the force sensor (torque sensor). For the measurement of the displacement, a motion capture system using a marker or a capture system based on skeleton estimation without using a marker is used.

In this method, the operator OP does not move the finger when applying an external force to the force sensor, thus making it difficult to perform calibration simultaneously for the reaction force and the displacement. On the other hand, since no device is worn on the finger, the calibration process becomes smooth and can be performed in a short time.

(2) Method Using Wearable Device

An exoskeleton-type device capable of actively applying a force and acquiring position information of a finger is worn by the operator OP, and the operator OP applies a load to the device to simultaneously measure a reaction force and displacement.

While this method may be relatively time-consuming due to the need for preparation and auxiliary calibration associated with the use of the wearable device, it is possible to perform calibration simultaneously for reaction force and displacement.

(3) Method Using Weight

Calibration is performed by attaching a weight with a pre-measured mass to the finger of the operator OP and calculating the reaction force against gravity acting on the weight when the operator OP moves the finger. For the measurement of the displacement, a capture system similar to (1) the method using the force sensor is used.

While this method may be relatively time-consuming due to the need to attach the weight, it is possible to realize, at low cost, calibration simultaneously for reaction force and displacement.

(4) Method for Measuring Only Displacement

Only the movement (displacement) of the finger of the operator OP is measured by use of a motion capture system using a marker, a capture system based on skeleton estimation without using a marker, or the like. In this case, force feedback with a certain degree of accuracy can also be realized by applying a general model constructed in advance.

Since this method does not require the attachment of a device to the finger or the like of the operator OP, it is effective for calibration with a general model constructed, that is, calibration for a specified user at the use site.

The four calibration methods described above may be used for both the construction of a general model and the construction of a unique model for a specified user, and may be used separately or in combination.

9. Modification

In the remote operation system described above, the input device worn by the operator has controlled the motion of the operation target. The present invention is not limited thereto, and the input device worn by the operator can also control the motion of the operation target via a computer in any place, such as a server in a cloud.

Figure 16:
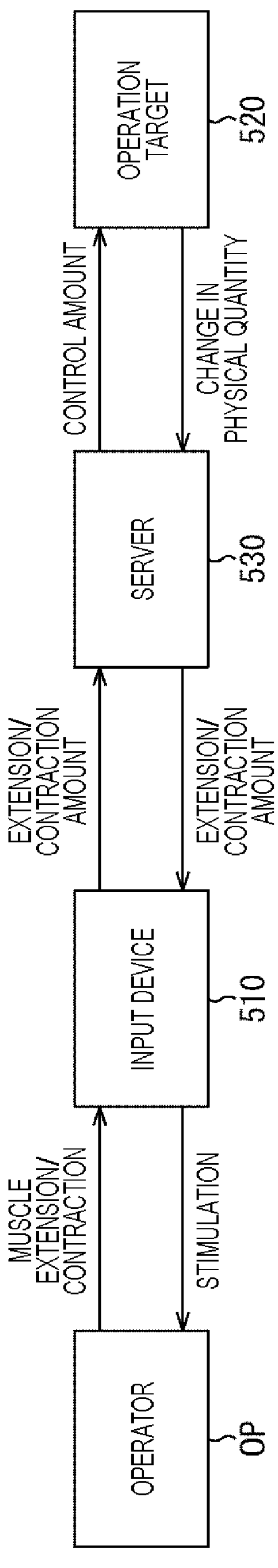
FIG. 16 is a diagram illustrating another configuration example of the remote operation system.

FIG. 16 is a diagram illustrating another configuration example of the remote operation system to which the technology according to the present disclosure is applicable.

The remote operation system of FIG. 16 is configured to include a server 530 configured in a cloud, for example, in addition to an input device 510 and an operation target 520.

The input device 510 receives, as an input, the extension or contraction of the muscle of the body site of the operator OP, who is the user, and supplies the extension/contraction amount to the server 530.

The server 530 is a form of an information processing apparatus to which the technology according to the present disclosure is applied. The server 530 controls the motion of the operation target 520 on the basis of the control amount corresponding to the extension/contraction amount from the input device 510.

The operation target 520 moves on the basis of the control amount from the input device 510, and supplies the server 530 with change information indicating a change in physical quantity corresponding to the extension or contraction of the muscle of the body site of the operator OP. The server 530 calculates the extension/contraction amount of the muscle corresponding to the change in physical quantity (reaction force or displacement) related to the operation target 520 on the basis of the change information supplied from the operation target 520, and supplies the extension/contraction amount to the input device 510. The input device 510 inputs stimulation to the muscle of the operator OP on the basis of the extension/contraction amount supplied from the server 530.

Figure 17:
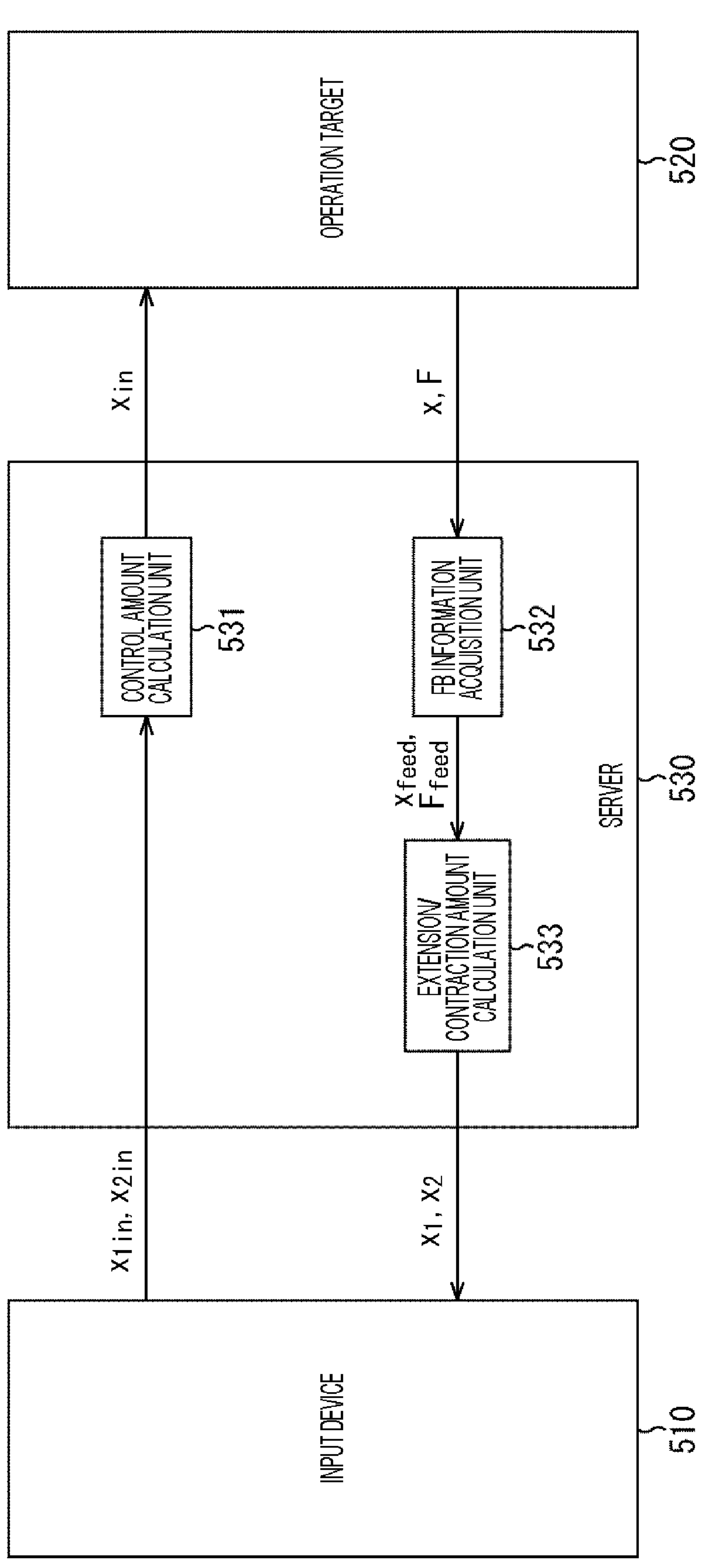
FIG. 17 is a block diagram illustrating a functional configuration example of a server.

FIG. 17 is a block diagram illustrating a functional configuration example of the server 530.

As illustrated in FIG. 17, the server 530 includes a control amount calculation unit 531, an FB information acquisition unit 532, and an extension/contraction amount calculation unit 533.

The control amount calculation unit 531 calculates the control amount $x_{in}$ to be input to the operation target 520, using the extension/contraction amounts $x_{1in}$, $x_{2in}$ from the input device 510. The calculated control amount $x_{in}$ is supplied to the operation target 520.

The FB information acquisition unit 532 acquires the reaction force F and the displacement x supplied as the change information from the operation target 520, and converts the reaction force F and the displacement x into the pseudo reaction force $F_{feed}$ and the pseudo displacement $X_{feed}$ to be applied the index finger of the operator OP, for example. The pseudo reaction force $F_{feed}$ and the pseudo displacement $X_{feed}$ are supplied to the extension/contraction amount calculation unit 533.

The extension/contraction amount calculation unit 533 calculates the extension/contraction amounts $x_1$, $x_2$ of the antagonistic muscles on the basis of the pseudo reaction force $F_{feed}$ and the pseudo displacement $X_{feed}$ from the FB information acquisition unit 532. The calculated extension/contraction amounts $x_1$, $x_2$ are supplied to the input device 510.

Note that, in the configuration of FIG. 17, the reaction force and displacement being received by the operation target 520 are fed back to the operator OP, but only the reaction force may be fed back to the operator OP as in Method 2. Furthermore, as in Method 3, only the displacement may be fed back to the operator OP.

Such a configuration also makes it possible to provide haptic feedback in a pseudo manner by stimulating the muscle of the operator OP.

10. Other Application Examples

The technology according to the present disclosure is also applicable to the operation target and the site to be fed back described above.

(1) Operation Target

In the embodiments described above, the remote-operated robot has been controlled as the operation target.

The present invention is not limited thereto, and an automobile, a motorcycle, an aircraft, a ship, and other automated devices and machines existing in real space may be controlled as the physical operation target. Furthermore, a virtual object in a game, experience, or the like using virtual reality (VR)/augmented reality (AR) devices may be controlled as a non-physical operation target.

Moreover, the operation target is not limited to an object, but may be a living object. In this case, for example, sensation sharing and remote operation between people would be possible.

(2) Site to be Fed Back

In the embodiments described above, the reaction force and displacement received by the operation target have been fed back to the finger of the person.

The present invention is not limited thereto, and the physical quantity received by the operation target may be fed back to any site, such as the hand, arm, foot, or torso, of the person according to a device that moves the site to be fed back. Furthermore, depending on the direction of the reaction force, the reaction force may be fed back to a muscle that does not antagonize a muscle actively moved by the person (operator).

(3) Examples of Physical Quantity

In the embodiments described above, the reaction force and displacement received by the operation target, the pseudo reaction force corresponding thereto, and the extension/contraction amount of the antagonistic muscle can be replaced with the following physical quantities.

- Reaction force received by operation target: moment, rigidity, etc.
- Displacement received by operation target: angular displacement, rotation angle, etc.
- Pseudo reaction force: torque, rigidity of finger (muscle), etc.
- extension/contraction amount of antagonistic muscle: voltage, current, tension, rigidity, etc.

Note that these physical quantities can also be used in the model construction and calibration described above.

(4) Stimulation Methods

In the embodiments described above, electrical stimulation has been input to the muscle at the time of feedback, but stimulation other than electrical stimulation may be input.

11. Configuration Example of Computer

A series of the processes described above can be executed by hardware, or may be executed by software. In a case where the series of processing is executed by software, a program constituting the software is installed on a computer built into dedicated hardware or a general-purpose personal computer from a program recording medium, or the like.

Figure 18:
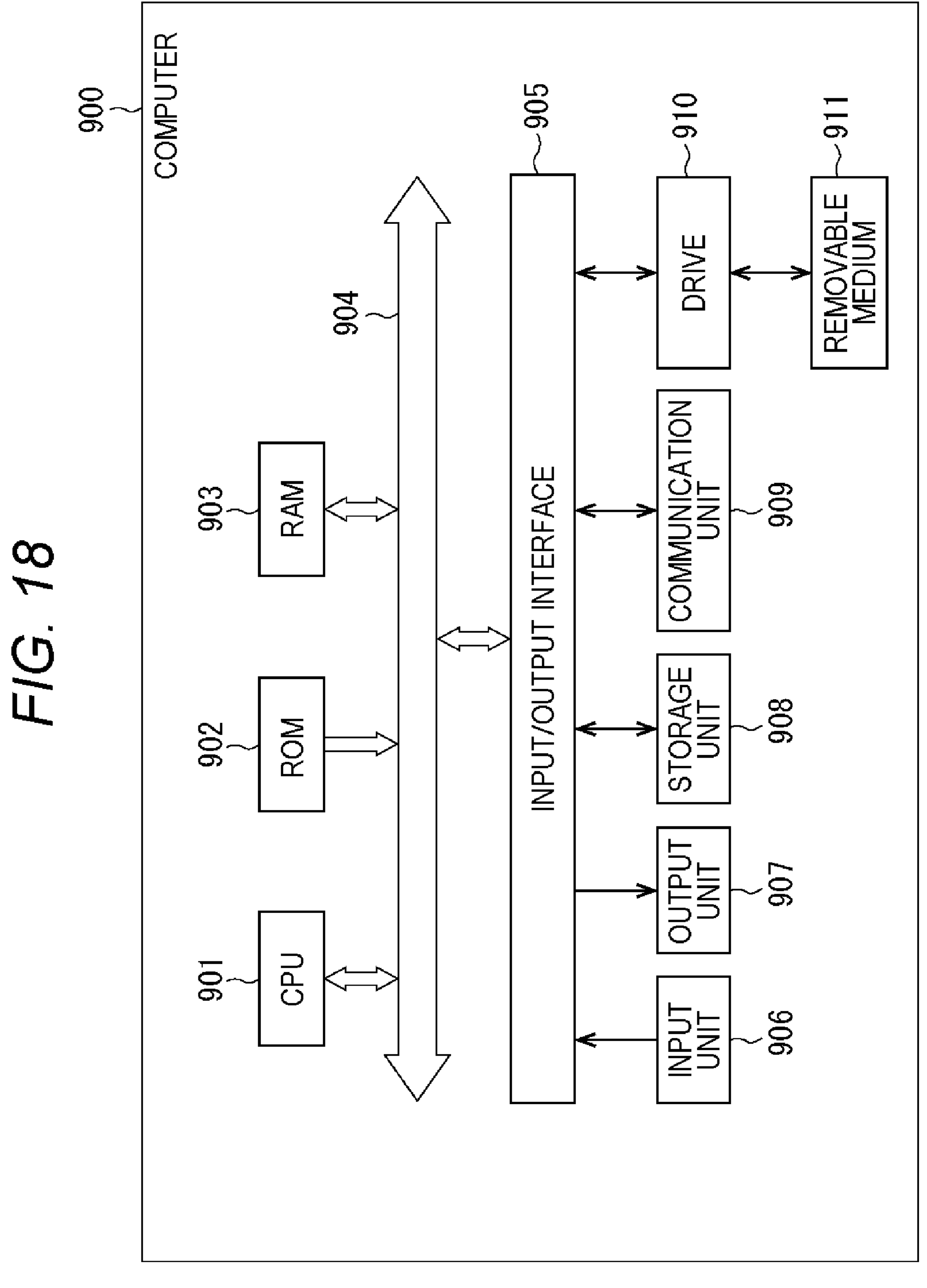
FIG. 18 is a block diagram illustrating a configuration example of a computer.

FIG. 18 is a block diagram illustrating a configuration example of hardware of a computer that executes the series of processing described above according to a program.

The input device 10 and the server 530 as the information processing apparatus to which the technology according to the present disclosure is applicable are realized by the computer 900 with the configuration illustrated in FIG. 18.

In a computer 900, a central processing unit (CPU) 901, a read-only memory (ROM) 902, and a random-access memory (RAM) 903 are mutually connected by a bus 904.

An input/output interface 905 is further connected to the bus 904. An input unit 906, an output unit 907, a storage unit 908, a communication unit 909, and a drive 910 are connected to the input/output interface 905.

The input unit 906 includes a keyboard, a mouse, a microphone, and the like. The output unit 907 includes a display, a speaker and the like. The storage unit 908 includes a hard disk, a non-volatile memory and the like. The communication unit 909 includes a network interface and the like. The drive 910 drives a removable medium 911 such as a magnetic disk, an optical disk, a magneto-optical disk, or a semiconductor memory.

In the computer 900 configured as described above, for example, the CPU 901 loads a program stored in the storage unit 908 into the RAM 903 via the input/output interface 905 and the bus 904 and executes the program, whereby the above-described series of processing is performed.

The program executed by the computer 900 (CPU 901) can be provided by being recorded in the removable medium 911 as a package medium and the like, for example. Furthermore, the program can be provided via a wired or wireless transmission medium such as a local area network, the Internet, or digital satellite broadcasting.

In the computer 900, the program can be installed in the storage unit 908 via the input/output interface 905 by attaching the removable medium 911 to the drive 910. Furthermore, the program may be received by the communication unit 909 via a wired or wireless transmission medium to be installed on the storage unit 908. In addition, the program may be installed in advance on the ROM 902 and the storage unit 908.

Note that the program executed by the computer 900 may be a program in which processing is performed in time series in the order described in the present specification, or may be a program in which processing is performed in parallel or at necessary timing such as when a call is made.

In the present specification, a step of describing a program recorded in a recording medium includes not only processing performed in chronological order according to the described order, but also processing executed in parallel or individually even if the processing is not necessarily performed in chronological order.

The embodiments of the technology according to the present disclosure are not limited to the embodiments described above, and various modifications can be made without departing from the scope of the technology according to the present disclosure.

For example, the technology according to the present disclosure can have a configuration of cloud computing in which one function is shared and processed in cooperation by a plurality of devices via a network.

Furthermore, each step described in the flowcharts described above may be executed by one device, or may be executed by a plurality of devices in a shared manner.

Moreover, in a case where a plurality of processing is included in one step, the plurality of processing included in one step can be executed by one device or by a plurality of devices in a shared manner.

The effects described in the present description are merely examples and are not limited, and other effects may be provided.

Moreover, the technology according to the present disclosure can have the following configurations.

(1)

An information processing apparatus including:

an acquisition unit that acquires change information indicating a change in physical quantity related to an operation target corresponding to extension or contraction of a muscle of a site in a body of a user; and a calculation unit that calculates an extension/contraction amount of the muscle corresponding to the change in physical quantity on the basis of the change information.

(2)

The information processing apparatus according to (1), further including an input unit that inputs stimulation to the muscle on the basis of the extension/contraction amount calculated.

(3)

The information processing apparatus according to (2), in which the input unit inputs electrical stimulation to the muscle via an electrode in contact with a place away from the site in the body of the user.

(4)

The information processing apparatus according to (2) or (3), in which the acquisition unit acquires the change information corresponding to extension or contraction of at least one of antagonistic muscles forming a pair, and the calculation unit calculates the extension/contraction amount of the at least one of the antagonistic muscles on the basis of the change information.

(5)

The information processing apparatus according to (4), in which the acquisition unit acquires the change information indicating a reaction force received by the operation target from an environment and a displacement of an action unit on which the reaction force acts in the operation target, and the calculation unit calculates the extension/contraction amount of each of the antagonistic muscles corresponding to the reaction force and the displacement.

(6)

The information processing apparatus according to (4), in which the acquisition unit acquires the change information indicating a reaction force received by the operation target from an environment, and the calculation unit calculates the extension/contraction amount of the antagonistic muscle that has not been contracted corresponding to the reaction force out of the antagonistic muscles.

(7)

The information processing apparatus according to (4), in which the acquisition unit acquires the change information indicating a displacement of an action unit on which a reaction force received from an environment acts in the operation target, and the calculation unit calculates the extension/contraction amount of the antagonistic muscle that has not been contracted corresponding to the displacement out of the antagonistic muscles.

(8)

The information processing apparatus according to any one of (2) to (7), in which even in a case where intentional extension or contraction of the muscle, to which the stimulation is being input, by the user is detected, the input unit continues to input the stimulation to the muscle.

(9)

The information processing apparatus according to any one of (2) to (7), in which in a case where intentional extension or contraction of the muscle, to which the stimulation is being input, by the user is detected, the input unit stops inputting the stimulation to the muscle.

(10)

The information processing apparatus according to any one of (2) to (7), in which in a case where the extension/contraction amount due to intentional extension or contraction of the muscle, to which the stimulation is being input, by the user exceeds a predetermined amount, the input unit stops inputting the stimulation to the muscle.

(11)

The information processing apparatus according to any one of (1) to (10), in which the calculation unit calculates the extension/contraction amount of at least one of the muscles on the basis of a model for converting the change in physical quantity indicated by the change information into the extension/contraction amount.

(12)

The information processing apparatus according to (11), in which the model is a mapping model constructed using machine learning.

(13)

The information processing apparatus according to (11), in which the model is a mapping model constructed using a theoretical equation.

(14)

The information processing apparatus according to any one of (1) to (13), in which the extension/contraction amount calculated is supplied to an input device that inputs stimulation to the muscle on the basis of the extension/contraction amount.

(15)

The information processing apparatus according to any one of (1) to (14), in which the change in physical quantity includes at least one of a reaction force received by the operation target from an environment in real space or a displacement of an action unit on which the reaction force acts in the operation target.

(16)

The information processing apparatus according to any one of (1) to (14), in which the change in physical quantity includes at least one of a reaction force received by the operation target from an environment in virtual space or a displacement of an action unit on which the reaction force acts in the operation target.

(17)

An information processing method including:

an information processing apparatus acquiring change information that indicates a change in physical quantity related to a motion of an operation target corresponding to a displacement in a muscle of a site in a body of a user; and the information processing apparatus calculating an extension/contraction amount of the muscle corresponding to the change in physical quantity on the basis of the change information.

(18)

A program that causes a computer to execute processing of:

acquiring change information indicating a change in physical quantity related to a motion of an operation target corresponding to a displacement in a muscle of a site in a body of a user; and calculating an extension/contraction amount of the muscle corresponding to the change in physical quantity on the basis of the change information.

REFERENCE SIGNS LIST

10 Input device
20 Operation target
111 Sensor
112 Extension/contraction amount measurement unit
113 Control amount calculation unit
114 FB information acquisition unit
115 Extension/contraction amount calculation unit
116 Stimulation input unit
117 Electrode
510 Input device
520 Operation target
530 Server
531 Control amount calculation unit
532 FB information acquisition unit
900 Computer
901 CPU

The invention claimed is:

1. An information processing apparatus, comprising:

a central processing unit (CPU) configured to:

acquire a first extension/contraction amount of a muscle of a site in a body of a user from a plurality of sensors;

control a motion of an operation target based on the acquired first extension/contraction amount of the muscle of the user, wherein the operation target is a remote-operated robot at a remote location from the user:

acquire change information indicating a change in a physical quantity associated with the remote-operated robot, wherein the change information corresponds to at least one of an extension or a contraction of the muscle of the site in the body of the user; and calculate a second extension/contraction amount of the muscle corresponding to the change in the physical quantity associated with the remote-operated robot, based on the acquired change information of the remote-operated robot.

2. The information processing apparatus according to claim 1, wherein the CPU is further configured to:

control input of an electrical an input unit that inputs stimulation to the muscle based on-a basis of the calculated second extension/contraction amount-calculated.

3. The information processing apparatus according to claim 2, wherein the electrical stimulation is input to the muscle via an electrode, and the electrode is in contact with a place, in the body of the user, away from the site in the body of the user.

4. The information processing apparatus according to claim 1, wherein the CPU is further configured to:

acquire the change information corresponding to the extension or the contraction of at least one of antagonistic muscles forming a pair of muscles; and calculate the second extension/contraction amount of the at least one of the antagonistic muscles, based on the acquired change information.

5. The information processing apparatus according to claim 4, wherein the CPU is further configured to:

acquire the change information indicating a reaction force received by the operation target from an environment and a displacement of an action unit on which the reaction force acts in the operation target; and calculate, based on the reaction force and the displacement, the second extension/contraction amount of each of the antagonistic muscles.

6. The information processing apparatus according to claim 4, wherein the CPU is further configured to:

acquire the change information indicating a reaction force received by the operation target from an environment; and calculate, based on the reaction force, the second extension/contraction amount of the antagonistic a non-contracted muscle of the antagonistic muscles.

7. The information processing apparatus according to claim 4, wherein the CPU is further configured to:

acquire the change information indicating a displacement of an action unit on which a reaction force received from an environment acts in the operation target; and calculate, based on the displacement, the second extension/contraction amount of a non-contracted muscle of the antagonistic muscles.

8. The information processing apparatus according to claim 2, wherein the CPU is further configured to:

detect intentional extension of the muscle to which the electrical stimulation is input, or intentional contraction of the muscle to which the electrical stimulation is input; and continue, subsequent to the detection, the input of the electrical stimulation to the muscle.

9. The information processing apparatus according to claim 2, wherein the CPU is further configured to:

detect one of intentional extension of the muscle to which the electrical stimulation is input, or intentional contraction of the muscle to which the electrical stimulation is input; and stop, subsequent to the detection, the input of the electrical stimulation to the muscle.

10. The information processing apparatus according to claim 2, wherein the CPU is further configured to:

detect one of the second extension/contraction amount due to intentional extension of the muscle to which the electrical stimulation is input exceeds a specific amount, or intentional contraction of the muscle to which the electrical stimulation is input exceeds the specific amount; and stop, subsequent to the detection, the input of the electrical stimulation to the muscle.

11. The information processing apparatus according to claim 1, wherein the CPU is further configured to calculate the second extension/contraction amount of the muscle based on a model, and the model converts the change in the physical quantity indicated by the change information into the second extension/contraction amount.

12. The information processing apparatus according to claim 11, wherein the model is a mapping model using machine learning.

13. The information processing apparatus according to claim 11, wherein the model is a mapping model using a theoretical equation.

14. The information processing apparatus according to claim 1, wherein the CPU is further configured to supply the calculated second extension/contraction amount to an input device, and the input device inputs stimulation to the muscle based on the second extension/contraction amount.

15. The information processing apparatus according to claim 1, wherein the change in the physical quantity includes at least one of a reaction force received by the operation target from an environment in real space or a displacement of an action unit on which the reaction force acts in the operation target.

16. The information processing apparatus according to claim 1, wherein the change in the physical quantity includes at least one of a reaction force received by the operation target from an environment in virtual space or a displacement of an action unit on which the reaction force acts in the operation target.

17. An information processing method, comprising:

acquiring a first extension/contraction amount of a muscle of a site in a body of a user from a plurality of sensors;

controlling a motion of an operation target based on the acquired first extension/contraction amount of the muscle of the user, wherein the operation target is a remote-operated robot at a remote location from the user;

acquiring change information that indicates a change in a physical quantity associated with the motion of the remote-operated robot, wherein the change information is based on a displacement in the muscle of the site in the body of the user; and calculating a second extension/contraction amount of the muscle corresponding to the change in the physical quantity associated with the remote-operated robot, based on the acquired change information of the remote-operated robot.

18. A non-transitory computer-readable medium having stored thereon, computer-executable instructions which, when executed by a computer, cause the computer to execute operations, the operations comprising:

acquiring a first extension/contraction amount of a muscle of a site in a body of a user from a plurality of sensors;

controlling a motion of an operation target based on the acquired first extension/contraction amount of the muscle of the user, wherein the operation target is a remote-operated robot at a remote location from the user;

acquiring change information indicating a change in a physical quantity associated with the motion of the remote-operated robot, wherein the change information is based on a displacement in the muscle of the site in the body of the user; and calculating a second extension/contraction amount of the muscle corresponding to the change in the physical quantity associated with the remote-operated robot, based on the acquired change information of the remote-operated robot.

* * * * *